United States Patent
Shin et al.

(10) Patent No.: US 7,067,566 B2
(45) Date of Patent: Jun. 27, 2006

(54) TRIAZINE RING BASED POLYMERS FOR PHOTOINDUCED LIQUID CRYSTAL ALIGNMENT, LIQUID CRYSTAL ALIGNMENT LAYER CONTAINING THE SAME, LIQUID CRYSTAL ELEMENT USING THE ALIGNMENT LAYER AND METHOD OF MANUFACTURING THE SAME

(75) Inventors: Dongcheon Shin, Bucheon-si (KR); Jinyool Kim, Seoul (KR); Kyusoon Park, Cheongju-si (KR); Taemin Kim, Suwon-si (KR)

(73) Assignee: LG Cable Ltd., Seoul (KR)

( * ) Notice: Subject to any disclaimer, the term of this patent is extended or adjusted under 35 U.S.C. 154(b) by 324 days.

(21) Appl. No.: 10/415,692

(22) PCT Filed: Nov. 11, 2002

(86) PCT No.: PCT/KR02/02101

§ 371 (c)(1),
(2), (4) Date: May 1, 2003

(87) PCT Pub. No.: WO03/042328

PCT Pub. Date: May 22, 2003

(65) Prior Publication Data

US 2004/0039150 A1 Feb. 26, 2004

(30) Foreign Application Priority Data

Nov. 12, 2001 (KR) .................................. 10-2001/70018
Nov. 12, 2001 (KR) .................................. 10-2001/70019

(51) Int. Cl.
*C08F 2/46* (2006.01)
*C09K 19/56* (2006.01)

(52) U.S. Cl. ........................... 522/173; 528/44; 528/60; 528/61; 528/64; 528/65; 528/67; 528/68; 528/73; 528/66; 522/167; 522/176; 522/904; 428/1.1; 428/1.2; 428/1.25; 428/1.26; 428/473.5; 428/474.4; 430/20; 430/56; 430/75; 430/80

(58) Field of Classification Search ................. 522/167, 522/173, 176, 904; 428/1.1, 1.2, 1.25, 1.26, 428/473.5, 474.4; 430/20, 56, 75, 80; 528/44, 528/60, 61, 64, 65, 66, 67, 68, 73
See application file for complete search history.

(56) References Cited

U.S. PATENT DOCUMENTS 6,187,485 B1 2/2001 Matsushima et al.
6,201,087 B1 3/2001 Herr et al.
6,218,501 B1 4/2001 Choi et al.

FOREIGN PATENT DOCUMENTS

JP 2-238052 A2 9/1990
JP 2000204250 A2 7/2000
JP 2000250047 A2 9/2000

OTHER PUBLICATIONS

Reversible Change in Alignment Mode of Nematic Liquid Crystals Regulated Photochemically by "Command Surfaces" Modified with an Azobenzene Monolayer, Langmuir 1988, vol 4, No. 5, 1214–1216.

*Primary Examiner*—Sanza L. McClendon
(74) *Attorney, Agent, or Firm*—Welsh & Katz, Ltd.

(57) ABSTRACT

Triazine ring based polymers for photoinduced liquid crystal alignment introduces photoactive groups for inducing, reinforcing, improving and preserving liquid crystal alignment, for example photoreactor such as cinnamate, coumarin, chalcone and maleimide, as a chain to have at least one photoactive group. One of the photoactive groups can experience Fries rearrangement which induces liquid crystal alignment, and other groups can experience photodimerization, photoisomerization, photocrosslinkng or photodegradation to reinforce, change or preserve the generated alignment.

14 Claims, 1 Drawing Sheet

TRIAZINE RING BASED POLYMERS FOR PHOTOINDUCED LIQUID CRYSTAL ALIGNMENT, LIQUID CRYSTAL ALIGNMENT LAYER CONTAINING THE SAME, LIQUID CRYSTAL ELEMENT USING THE ALIGNMENT LAYER AND METHOD OF MANUFACTURING THE SAME

TECHNICAL FIELD

The present invention relates to triazine ring based polymers for photoinduced liquid crystal alignment and a liquid crystal alignment layer using the polymers, and more particularly to polymers for photoinduced liquid crystal alignment which has at least one photoactive chromophore in which a side chain having a photoactive group for inducing liquid crystal alignment and reinforcing, improving and preserving the alignment of the liquid crystal is introduced to a principle chain of the polymer, and a liquid crystal layer using the polymers.

BACKGROUND ART

A polymer for photoinduced liquid crystal alignment is used as an agent for liquid crystal alignment of a device using optical characteristics of the liquid crystal. Generally, the polymer for photoinduced liquid crystal means materials which are able to align a liquid crystal by coating a polymer on a substrate and then irradiating ultraviolet rays on its surface to form anisotrophy thereon.

A liquid crystal element using the polymer for liquid crystal alignment is used in various fields including a liquid crystal display, a compensator, optical parts and so on. Thus, though the following description is focused on a display element, it should be understood that the liquid crystal alignment layer is not limitedly used for the display element but able to be applied to various fields described above.

Flat Panel Display (FPD) elements applied to a liquid crystal display device gradually substitute for existing Cathode Ray Tubes (CRT), since the elements are thin and light and capable of scaling-up. Among these FPDs, a Liquid Crystal Display (LCD) leads the FPD market at present because it is advantageous in the facts that it is convenient to carry and consumes low power. In addition, the application of this LCD is broadened to not only calculator and notebook computer but also wall-mounted television and High Definition Television (HDTV).

In order to realize an image with liquid crystal elements, the liquid crystal should be aligned to a predetermined direction on an interface between the liquid crystal and a transparent conductive glass so that the liquid crystal is switched between the transparent conductive glasses owing to an outside electric field. A degree of this liquid crystal alignment is a most important fact for determining the image quality of the ICDs.

Conventionally, there are known three representative methods for aligning a liquid crystal. A first method is a rubbing method shown in FIG. 1, which coats a polymer compound such as polyimide on a substrate and then rubs its surface with a rubbing drum around which a cloth having flock-printed nylon, polyester or rayon fibers is wrapped. A second method is a SiO deposition which deposits SiO on a substrate to an inclined direction. A third method is an alignment method which coats polymers for photoinduced liquid crystal alignment on a substrate and then irradiates a light to a perpendicular or inclined direction in order to cause photoreaction of the coated photopolymer material so that the anisotrophy is formed on its surface.

According to the first method, when rubbing the surface of the polymer compound with the rubbing drum, there are generated minute dusts or electric discharge due to static electricity, which may cause many problems in the liquid crystal panel manufacturing process. According to the second method, the deposition angle to the substrate and the uniformity of a film thickness are hardly maintained, and the process can be enlarged to a large scale. According to the third method, there are problems that a physical coherence between the photoinduced liquid crystal alignment polymer and the liquid crystal is too week and the alignment is weakened due to the heat, which makes the method not be brought into practice.

The liquid crystal alignment using the third method among them is developed to align the liquid crystal by inducing a photoreaction of the photopolymer using light irradiation and thus forming anisotrophy on the coating surface. This alignment method is a non-contact treatment method for the alignment surface and has a feature that the overall process is kept clean since static electricity, dusts or other contaminant particles are not generated. The possibility of the photo-alignment is revealed using an azobenzene compound (K. Ichimura et al. Langmuir, 4, 1214, 1988), and afterward various kinds of polymer compounds such as polymaleimide (H.J.Choi et al. U.S. Patent No. 6,218,501) and polyolefin (R.H.Herr et al. U.S. Patent No. 6,201,087) are developed as a photo-alignment material.

However, in order to put the photo-alignment method to practical use, there are needed improvement of photochemical stability, thermal stability and electrooptical properties and a large amount of ultraviolet rays. Therefore, there is needed the development of a new photo-alignment material to solve such problems.

DISCLOSURE OF INVENTION

The present invention relates to a non-contact liquid crystal alignment method using light irradiation which may align a liquid crystal into multi domains with solving the problems of the conventional contact-type rubbing method and the conventional contact-type SiO deposition. An object of the invention is to provide a new photo-alignment material which shows superior alignment characteristic, excellent thermal and optical stability and improved electrooptical properties for the liquid crystal.

In other words, the present invention provides a polymer for photoinduced liquid crystal alignment which has at least one photoactive chromophore by using a triazine derivative as a principle chain of the polymer and then introducing a side chain having a photoactive group for inducing alignment of the liquid crystal to the polymer chain and reinforcing, improving and preserving the alignment of the liquid crystal. Fires rearrangement which induces alignment of the liquid crystal may happen in one of the photoactive groups, while photodimerization, photoisomerization, photocrosslinking or photodegradation for the purpose of reinforcement, changing or preserving of the generated alignment may happen in other groups.

In addition, another object of the present invention is to provide a liquid crystal alignment layer using the polymer for photoinduced liquid crystal alignment.

Other objects and advantages of the present invention are described below, and would be better understood using the following embodiments of the invention. In addition, objects and advantages of the present invention can be realized by means and their associations revealed in the appended claims.

BRIEF DESCRIPTION OF THE DRAWINGS

These and other features, aspects, and advantages of preferred embodiments of the present invention will be more fully described in the following detailed description, taken accompanying drawings. In the drawings.

BEST MODES FOR CARRYING OUT THE INVENTION

Figure 1:
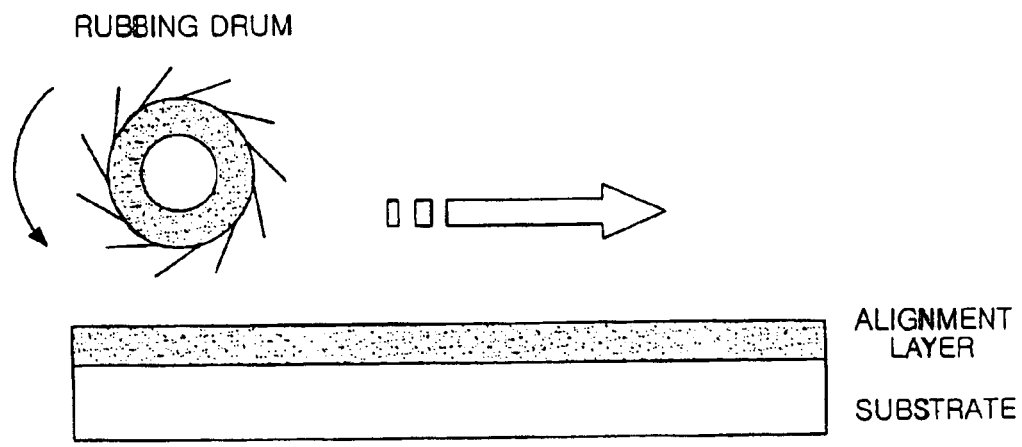
FIG. 1 is a side view for illustrating a conventional alignment process of a liquid crystal alignment layer.
Figure 2:
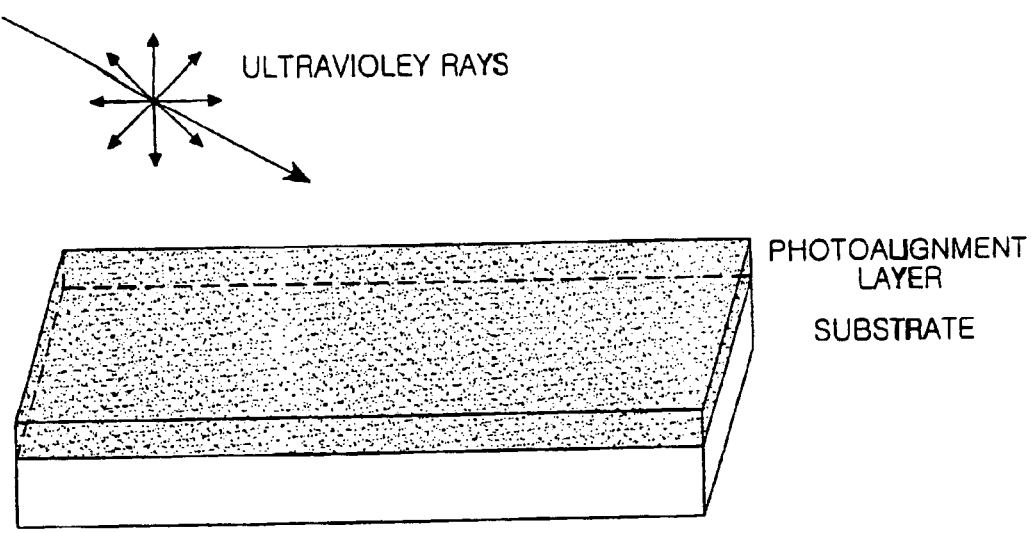
FIG. 2 is a schematic perspective view showing the alignment process of a liquid crystal alignment layer according to the present invention.

Hereinafter, preferred embodiments of the present invention will be described in detail with reference to the accompanying drawings.

First of all, terms and words used in the specification and the claims should be interpreted not in a limited normal or dictionary meaning, but to include meanings and concepts conforming with technical aspects of the present invention, based on the face that inventors may appropriately define a concept of a term to describe his/her own invention in a best way.

Therefore, the configurations described in the specification and drawn in the figures are just most preferred embodiments of the present invention, not to show all of the technical aspects of the present invention. So, it should be understood that there might be various equalities and modifications to be replaced with them.

A polymer for photoinduced liquid crystal alignment provided in the present invention includes a polymer having at least one photoactive group.

First Embodiment

In the first embodiment, a general formula of this polymer is as shown in Chemical Formula 1.

Chemical Formula 1

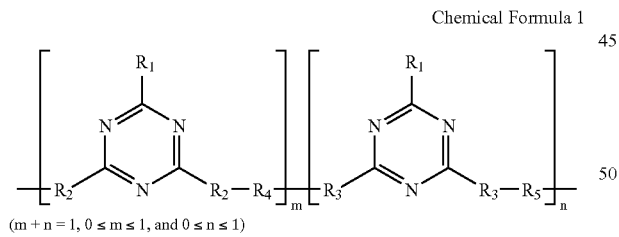

($m + n = 1$, $0 \le m \le 1$, and $0 \le n \le 1$)

In the Chemical Formula 1, $R_1$ is selected from (1a) to (4a) in the following Chemical Formula 2.

Chemical Formula 2

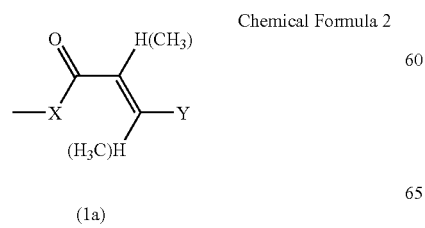

(1a)

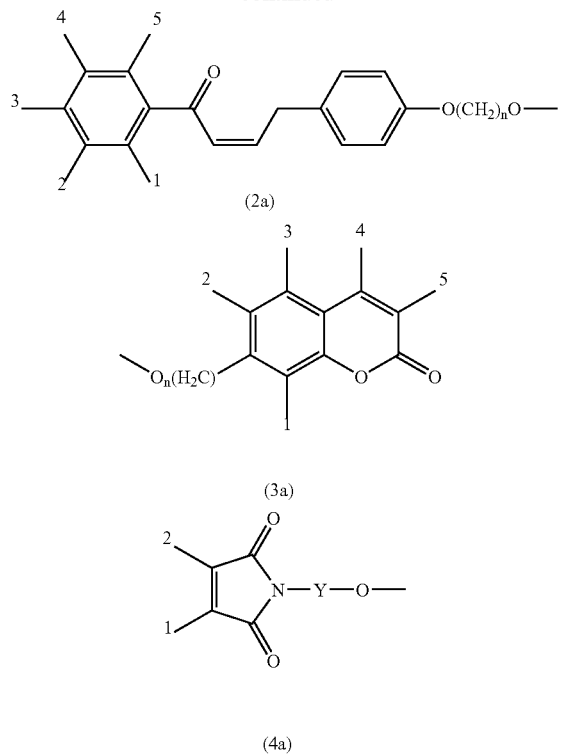

In (1a) of the Chemical Formula 2, X is one selected from the following Chemical Formula 3.

Chemical Formula 3

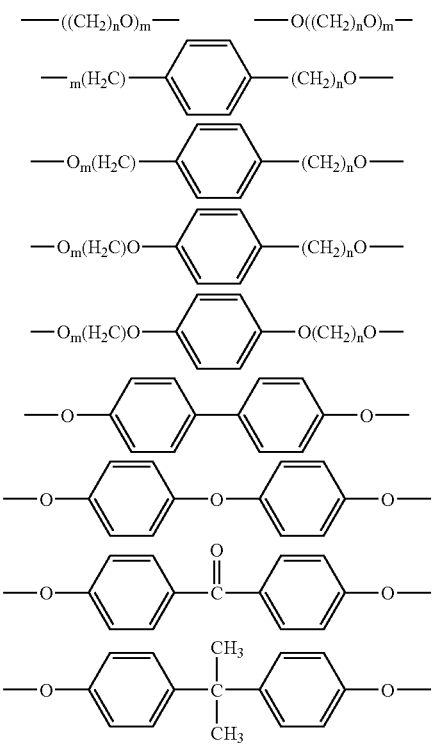

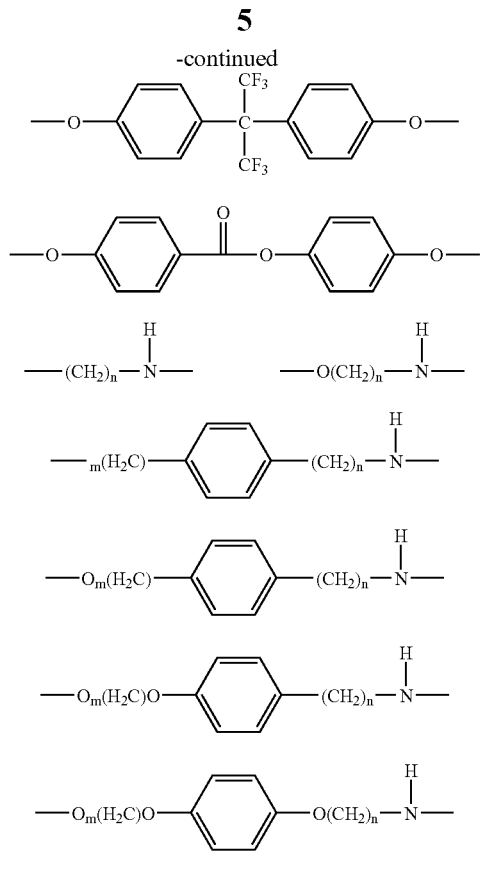

(Here, m and n are 0~10, respectively.)

In addition, in (1a) of the Chemical Formula 2, Y is one selected from the following Chemical Formula 4.

Chemical Formula 4

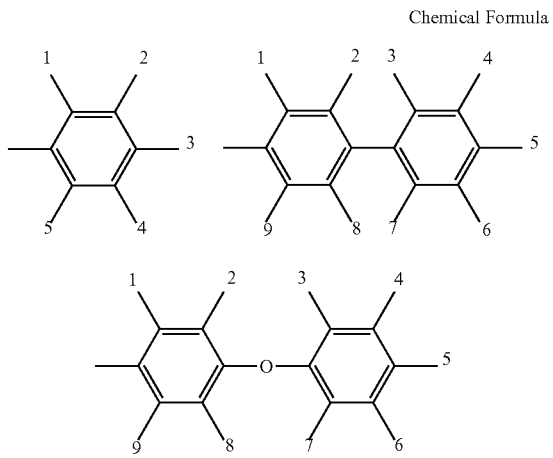

In the above Chemical Formula 4, the numerals 1, 2, 3, 4, 5, 6, 7, 8 or 9 is one selected from the following Chemical Formula 5.

Chemical Formula 5

—A   —(CA$_2$)$_n$CA$_3$   —O(CA$_2$)$_n$CA$_3$
—(O(CA$_2$)$_m$)$_n$CA$_3$   —O(CA$_2$)$_n$OCA$_3$   —(O(CA$_2$)$_m$)$_n$OCA$_3$ (Here, m and n are 0~10 respectively, and A and B are respectively H, F, Cl, CN, CF$_3$ or CH$_3$.)

In (2a) and (3a) of the Chemical Formula 2, n is 0~10, and the numerals 1, 2, 3, 4 and 5 are respectively selected from the following Chemical Formula 6.

Chemical Formula 6

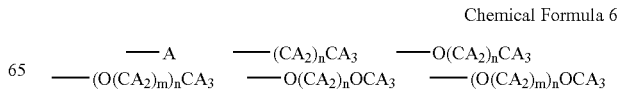

-continued

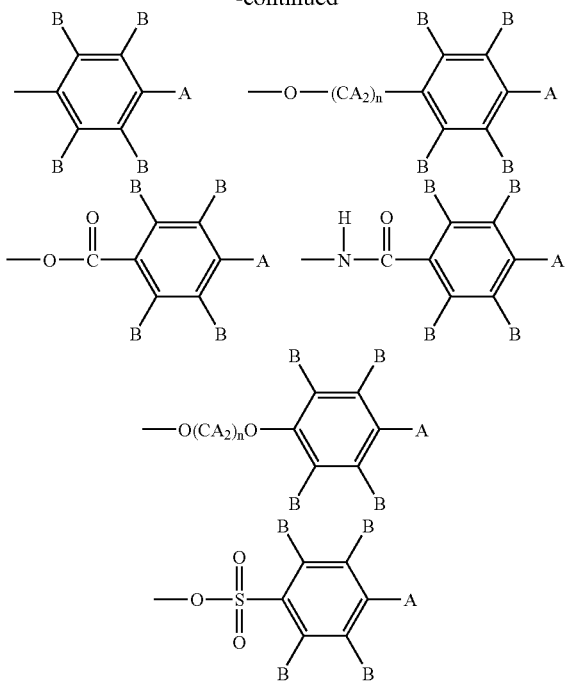

(Here, m and n are 0~10 respectively, and A and B are respectively H, F, Cl, CN, CF$_3$ or CH$_3$.)

In (4a) of the Chemical Formula 2, Y is one selected from the following Chemical Formula 7.

Chemical Formula 7

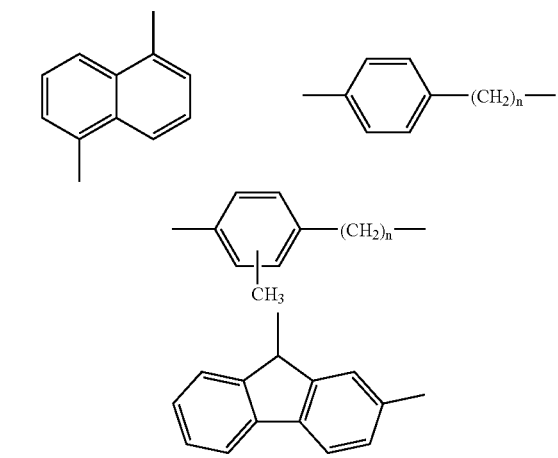

(Here, n is 0~10.)

In (4a) of the Chemical Formula 2, the numerals 1 and 2 are respectively selected from the following Chemical Formula 8.

Chemical Formula 8

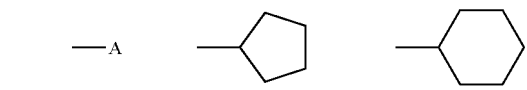

(Here, A is H, F, CH$_3$, CF$_3$ or CN.)

In the above Chemical Formula 1, R$_2$ and R$_3$ are respectively based on one amine selected from the following Chemical Formula 9.

Chemical Formula 9

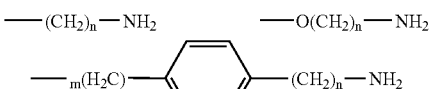
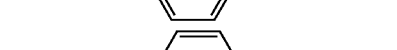
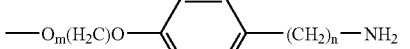
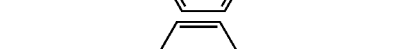

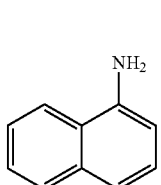
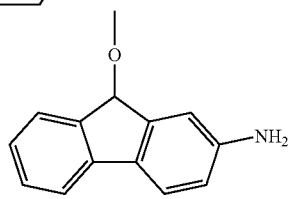

(Here, m and n are 0~10, respectively.)

In addition, in the above Chemical Formula 1, R$_4$ and R$_5$ are respectively based on one carboxylic acid derivative or carboxylic acid dianhydride selected from the following Chemical Formula 10.

Chemical Formula 10

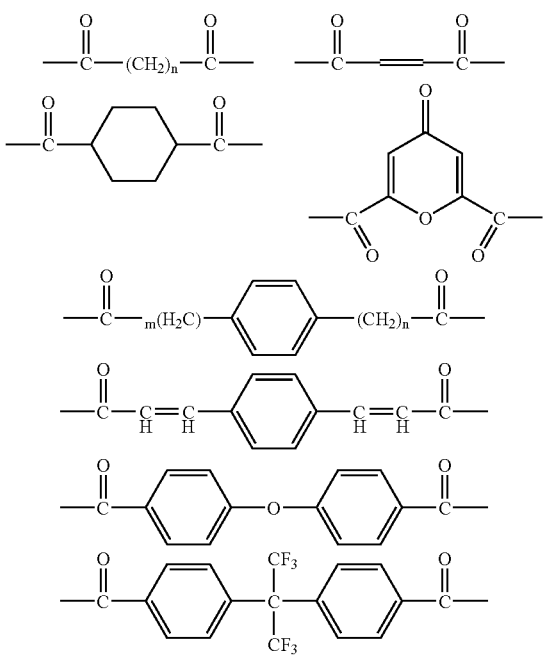

-continued

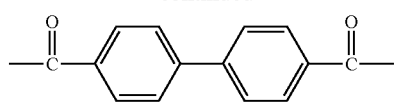
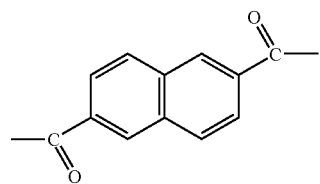
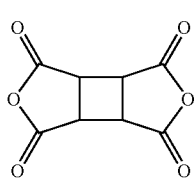
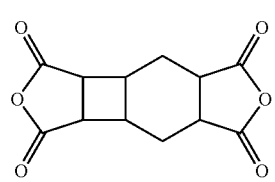
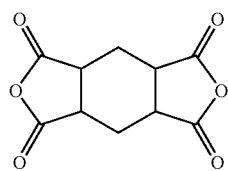
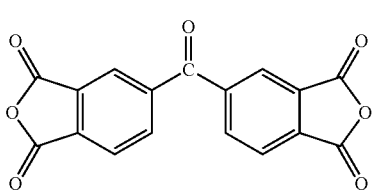
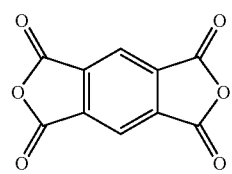
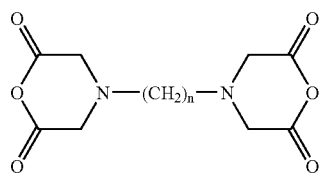
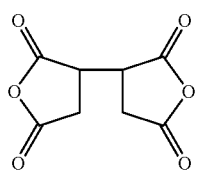
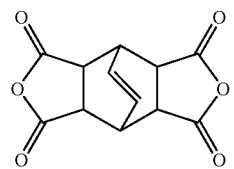
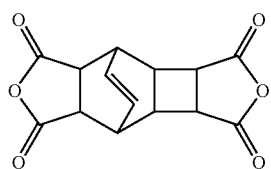

-continued

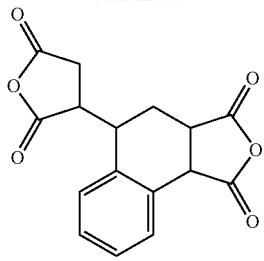
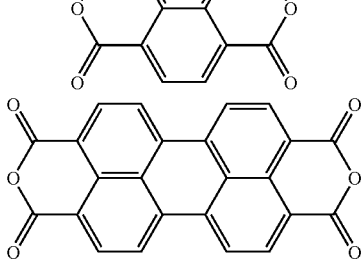

(Here, m and n are 0~10, respectively.)

In the present invention, the chemical linkages between $R_2$, $R_3$ and $R_4$, $R_5$ (i.e., between $R_2$ and $R_4$, $R_2$ and $R_5$, $R_3$ and $R_4$, and $R_3$ and $R_5$) in the chemical formula 1 can be amide linkage, imide linkage or their mixture respectively.

The first embodiment of the invention is described based on the amide linkage formation.

In the Chemical Formula 1, the linkage between $R_2$, $R_3$ and $R_4$, $R_5$ (i.e., between $R_2$ and $R_4$, $R_2$ and $R_5$, $R_3$, and $R_4$ and $R_3$ and $R_5$) is performed by the amide linkage formation obtained by the reaction of amine and carboxylic acid, which is generally represented with the following Reaction Formula 1.

Reaction Formula 1

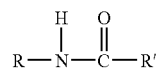

R—NH$_2$ + R'—COOH $\xrightarrow{-H_2O}$ R—N(H)—C(=O)—R'

In the reaction formula 1, R and $R^1$ are organic groups respectively. As shown in the above amide product, R is derived from amine compound, which is related to $R_2$ or $R_3$ in the chemical formula 1. Additionally, R' is derived from carboxylic acid compound, which is related to $R_4$ or $R_5$ in the chemical formula 1.

$R_2$ and $R_3$ of the above Chemical Formula 1 are amine moieties respectively derived from one selected from the group consisting of the following Chemical Formula 11.

Chemical Formula 11

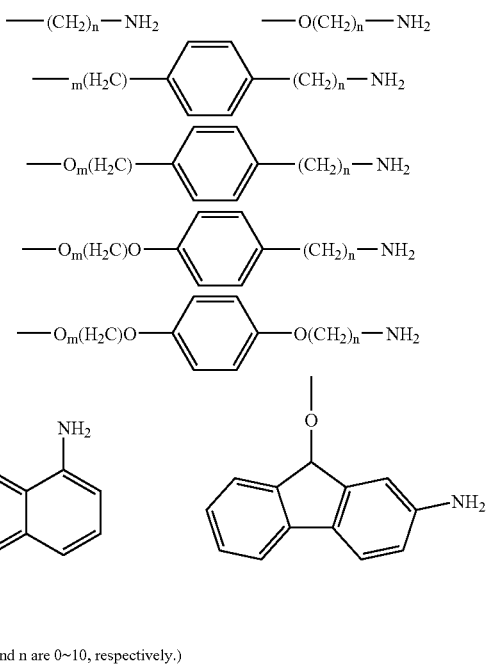

(Here, m and n are 0~10, respectively.)

In addition, $R_4$ and $R_5$ of the above Chemical Formula 1 are carboxylic acid moieties respectively derived from one selected from the group consisting of the following Chemical Formula 12.

Chemical Formula 12

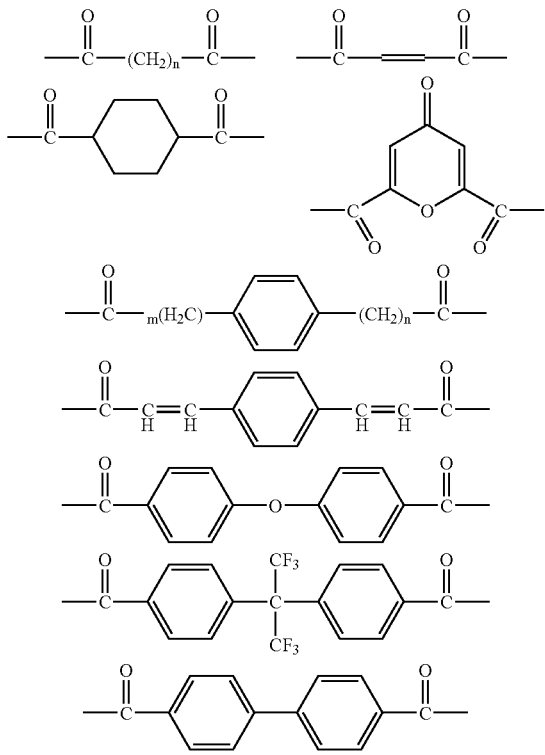

-continued

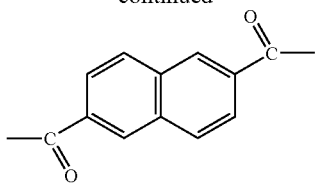

(Here, m and n are 0~10, respectively.)

In addition, any benzene ring structure included in $R_1$, $R_2$, $R_3$, R4 and $R_5$ in the polymer of the Chemical Formula 1, which represented by the Chemical Formulas 2 to 12, may have not only the above-described para- structure but also ortho-, meta- structure or a mixing structure of ortho-, meta- and para-.

The polyamide polymer represented by the above Chemical Formula 1 according to the first embodiment of the present invention has at least one photoactive group. One of the photoactive groups may experience photodegradation, another group may experience Fires rearrangement and other groups may experience photodimerization, photoisomerization or photocrosslinking for the purpose of reinforcement, changing or preserving of the generated alignment.

An agent for liquid crystal alignment including the polymer represented by the Chemical Formula 1 according this embodiment can be used to make a liquid crystal alignment layer containing the polymer by coating the polymer on a substrate and then irradiating ultraviolet rays thereon. In particular, the polymer for photoinduced liquid crystal alignment may change a pretilt angle of the liquid crystal which is arranged according to a pretilt angle of the irradiated ultraviolet rays. The polymer also makes the pretilt angle of the liquid crystal to 0° by changing chemical structure or manipulating an irradiation angle of the ultraviolet rays.

Thus, Liquid Crystal Display (LCD) made using the polymer for photoinduced liquid crystal alignment can be applied to various modes such as SIN (Super Twisted Nematic), TN (Twisted Nematic), IPS (In Plane Switching), VA (Vertical Alignment) and VATN (Vertically Aligned Twisted Nematic).

In addition, a liquid crystal element endowed with the liquid crystal alignment by the liquid crystal alignment layer can be used in various applications such as compensator or optical parts as well as the LCD.

Hereinafter a method of making a liquid crystal alignment layer using the polymer for photoinduced liquid crystal alignment of the first embodiment is described in detail.

First Process

1~20 wt % of a liquid crystal alignment agent having the polymer of the present embodiment expressed by the chemical formula 1 is dissolved into an organic solvent to have viscosity of 1~100 cps, and then the agent is coated on a substrate in a thickness of 10~500 nm to form an alignment layer.

The organic solvent is selected from chlorobenzene, N-methyl-pyrrolidone (NMP), N-ethyl-pyrrolidone (NEP), N,N-dimethyl-imidazolidone (DMI), N,N-dipropyle-imidazolidone (DPI), dimethyl-formamide (DMF), dimethyl-acetamide (DMAc), dimethyl-sulfoxide (DMSO), cyclopentanon, cyclohexanon, dichloro-ethane, butyl-cellusolve, γ-butyroactone and tetra-hydrofuran, or their mixture.

The liquid crystal alignment agent solved in the organic solvent is coated on a substrate such as an ITO glass substrate in a predetermined thickness in a range of 10~500 nm in order to form a layer. At this time, the coating process can be executed using any of possible conventional ways such as spin coating and roll printing.

Second Process

Irradiate ultraviolet rays on the surface of the alignment layer coated with the liquid crystal alignment agent obtained in the first process in order to make a liquid crystal alignment layer containing the polymer. At this time, to make the liquid crystal alignment layer, ultraviolet rays linearly polarized using a polarizer or unpolarized ultraviolet rays without using a polarizer are obliquely or perpendicularly irradiated.

Hereinafter, the first embodiment is described in more detail with the use of more concrete embodiments. The following embodiments are used for exemplifying concrete realization modes of the present invention, and they should be not interpreted to limit or restrict the scope of the invention.

Embodiment 1—1

A polyamide polymer for photoinduced liquid crystal alignment having a cinnamate chromophore (1) Reforming of Triazine Ring 27.1 g of 4(2-tetrahydropyranyl methoxy)bromobenzene is dissolved into 250 ml of anhydrous tetrahydrofuran in three-neck flask filled with nitrogen, and then after inserting 3 g of magnesium, it is stiired for 24 hours. This solution is reacted at −20° C. for 12 hours in a three-neck flask filled with nitrogen while slowly dropping 18.4 g of cyanuric chloride into 200 ml of anhydrous tetrahydrofuran.

After the reaction, the reaction solution is decompressed at a room temperature to remove the tetrahydrofuran, and then dissolved in ethylacetate. After mixing this solution with basic solution and severely agitating it to extract impurities, aqueous phase is separated and removed from the solution, and then the solution is decompressed at a room temperature to remove ethylacetate.

The solid phase material remaining after the removal of solvent is recrystallized in n-hexane to obtain 2-(4-(2-tetrahydropyranylmethoxy)phenyl)-4,6-dichloro- 1,3, 5-triazine.

(2) Introduction of a Hydroxy Functional Group into a Triazine Ring

After putting 34.0 g of the material obtained in (1) of the embodiment 1-1 into a round bottom flask and then dissolving it with 300 ml of tetrahydrofuran, 0.3 g of pyridinum-paratoluene-sulfonate is additionally put into the flask and 50 ml of ethanol is added for reaction during 24 hours.

After the reaction, the solvent is removed by distillation under reduced pressure, and then remained solids are dissolved again by methylene-chloride and then blended with distilled water in a separating funnel to extract impurities twice. Calcium chloride is put into the methylene chloride solution to remove water, and then the solvent is removed again through distillation under reduced pressure. This solid phase is recrystallized in a mixed solvent of methylene chloride and n-hexane to obtain 2-(4-hydroxyphenyl)-4,6-dichloro-1, 3, 5-triazine.

(3) Synthesis of a Triazine Ring Having Cinnamate Side Chain

Put 25.6 g of the triazine derivative obtained in (2) of the embodiment 1—1 into a round bottom flask filled with nitrogen and then dissolve it by putting 200 ml of anhydrous tetrahydrofuran. After adding 15.2 g of triethylaniine to this solution and then lowering the temperature of the solution to −5° C., the solution is severely stirred and reacted for 12 hours with slowly dropping a cinnamoyl chloride solution diluted by putting 100 ml of anhydrous tetrahydrofuran into 25 g of cinnamoyl chloride.

After the reaction, the reacted solution is distilled under reduced pressure to remove tetrahydrofuran, and then the solution is dissolved by methylene chloride, passes through a filter filled with silica gels and is then distilled under reduced pressure to remove the solvent.

Finally, after recrystallization in an 1:1 mixed solvent of methylene chloride and n-hexane, the solution is filtered under reduced pressure. The obtained solid phase material is dried under vacuum to obtain a triazine having a cinnamate side chain.

(4) Synthesis of a Triazine Monomer Having Diamine Functional Group 38.6 g of the triazine derivative obtained in a way of (3) of the embodiment 1—1 is put into a round bottom flask and dissolved by 400 ml of chloroforum. 32.8 g of 4-aminophenol and 12 g of sodium hydroxide are dissolved in 300 ml of distilled water to which 3 g of cetyltrimethy-lammonium bromide is dissolved, and then they are mixed with the above triazine derivative solution and severely stirred and reacted for 24 hours. After the reaction, organic solution phase is separated, and the reacted solution is moved to a separating funnel and washed three times with distilled water to extract impurities, and then water is removed by calcium chloride. The solution is distilled under reduced pressure to remove chloroform which is an organic solvent, and then recrystallized in a mixed solvent of methylene chloride and n-hexane.

The deposited crystal is filtered under reduced pressure and then dried under vacuum to obtain a triazine monomer.

(5) Polymerization of Polyamide Polymer for Photoinduced Liquid Crystal Alignment Having a Cinnamate Functional Group 53.156 g of the triazine monomer obtained in the way of (4) of the embodiment 1—1 is put into a round bottom flask filled with nitrogen and dissolved by 400 ml of anhydrous tetrahydrofuran, and then 20.238 g of triethyine is added to the solution. 20.3 g of terephthaloyl chloride is dissolved in 100 ml of anhydrous tetrahydrofuran, and then with slowly dropping it into the above-mentioned solution in which the triazine monomer and triethylamine are dissolved, the solution is severely stirred and reacted for 12 hours.

After the reaction, the reaction solution is slowly poured into methanol for precipitation, filtering and drying a deposit under vacuum. The process for dissolving the obtained deposit again in tetrahydrofuran and then precipitating in methanol is repeated twice, and then it is dried under vacuum to obtain synthesized polyamide polymer for liquid crystal alignment having a cinnamate photoinduced functional group with the use of a triazine ring.

(6) Fabrication of a Liquid Crystal Display Cell

The obtained photoalignment agent is dissolved in a mixed solution of NMP and butylcellusolve to have a density of 8 wt %, and then passes through a filtration membrane having a pore size of 0.1 μn so as to eliminate impurity particles. This solution is printed in a thickness of about 300 nm on a glass substrate coated with transparent electrodes for the purpose of coating the photoalignment agent, and then the glass substrate is dried during about 1 hour at about 200° C. in order to remove the solvent. Then, complex photoreactions such as photopolymerization of cinnamate group or photodegradation of polymer chain are induced to the glass substrate by irradiating ultraviolet rays of 500 W mercury lamp to the glass substrate one time per 2 seconds~10 minutes at an oblique angle of 20°, thereby making a liquid crystal alignment layer containing polymer. Spacers having a size of 4~5 μn are sprayed on two glass substrates, and then the glass substrates are attached using epoxy adhesive to have a cell gap of 4~5 μm. This cell experiences a hardening process at 130° C. for 1 hour in order to harden the epoxy adhesive, so a cell in which two glass substrates are absolutely adhered is manufactured. Liquid crystal is injected into the manufactured cell, and the cell experiences one time a heat treatment process for heating at 100~130° C. during 1 hour and then cooling to an ambient temperature. Then, a liquid crystal display cell is finally obtained.

Embodiment 1-2

A polyamide polymer for photoinduced liquid crystal alignment having a chalcone chromophore (1) Synthesis of Chalcone Functional Group 10 g of methoxy chalcone and 2.05 g of sodium cyanide are dissolved into 100 ml of dimethyl-sulfoxide, and then reacted for 24 hours. After the reaction, the reacted solution is mixed with chloroform and agitated together with distilled water so as to extract impurities. After removing the solution phase, the solution is decompressed at a room temperature in order to eliminate chloroform. After recrystallization of the remained solid phase in methanol, the solution is dried under vacuum, thus obtaining 4-hydroxychalcone for photoreaction.

(2) Introduction of a Hydroxy Functional Group into a Triazine Ring 23.8 g of 4-hydroxychalcone synthesized in a way of (1) of the embodiment 1-2 is put into a round bottom flask filled with nitrogen and then dissolved in 240 ml of anhydrous tetrahydrofuran. 2.4 g of sodium hydride (NaH) is added to the solution and reacted at a room temperature for 6 hours. The solution is reacted at −5° C. for 24 hours by severely stirring with slowly dropping into a solution which is made by putting 18.4 g of cyanuric chloride into a round bottom flask and then dissolving it into 200 ml of anhydrous tetrahydrofuran as mentioned in (1) of the embodiment 1-1 . After the reaction, tetrahydrofuran is removed by distillation under reduced pressure, and then remained solids are dissolved again into chloroform. This solution is washed three times with distilled water at a separating funnel to extract impurities, and then water is removed by calcium chloride. The solution is then distilled under reduced pressure to remove chloroform, and then recrystallized with a mixed solvent of methylene chloride and n-hexane. The recrystallized material is filtered under reduced pressure and then dried under vacuum to obtain triazine derivative having chalcone functional group.

(3) Synthesis of a Triazine Monomer having Diamine Functional Group 38.6 g of the triazine derivative having a chalcone functional group synthesized in a way of (2) of the embodiment 1-2 is put into a round bottom flask and dissolved by 300 ml of chloroform. 32.8 g of 4-aminophenol and 12 g of sodium hydroxide are dissolved in 300 ml of distilled water to which 3 g of cetyltrimethylammonium bromide is dissolved, and then they are mixed with the above triazine derivative solution and severely reacted for 24 hours. After the reaction, organic solution phase is separated and moved to a separating funnel and washed three times with distilled water to extract impurities. And then, water is removed by calcium chloride. The solution free from water is distilled under reduced pressure to remove chloroform which is an organic solvent, and then recrystalized in a mixed solvent of methylene chloride and n-hexane. The deposited crystal is filtered under reduced pressure and then dried under vacuum to obtain a triazine monomer.

(4) Polymerization of Polyamide Polymer for Photoinduced Liquid Crystal Alignment having a Chalcone Chromophore 53.15 g of the triazine monomer obtained in the way of (3) of the embodiment 1-2 Is put into a round bottom flask filled with nitrogen and dissolved by 400 ml of anhydrous tetrahydrofuran, and then 20.24 g of triethylamine is added to the solution. 20.3 g of terephthaloyl chloride is dissolved in 100 ml of anhydrous tetrahydrofuran, and then with slowly dropping it into the above-mentioned solution in which the triazine monomer and triethylamine are dissolved, the solution is severely stirred and reacted for 12 hours. After the reaction, the reaction solution Is slowly poured into methanol for precipitation, filtering and drying a deposit under vacuum. The process for dissolving the obtained polymer again in tetrahydrofuran and then precipitating in methanol is repeated twice, and then it is dried under vacuum to finally obtain synthesized polyamide polymer for photoinduced liquid crystal alignment having a chalcone functional group with the use of a triazine ring.

(5) Fabrication of a Liquid Crystal Display Cell

A liquid display cell is made in a way of (6) of the embodiment 1-1 by use of the polyamide polymer for photoinduced liquid crystal alignment obtained in a way of (4) of the embodiment 1-2.

Embodiment 1-3

A polyamide polymer for photoinduced liquid crystal alignment having a coumarin chromophore (1) Introduction of a Coumarin Chromophore 16.2 g of 7-hydroxycoumarin and 2.4 g of sodium hydride (NaH) are put into a round bottom flask filled with nitrogen, and then they are dissolved into 160 ml of anhydrous tetrahydrofiuran. After that, the solution is severely stirred and reacted for 6 hours. This solution is severely stirred and reacted for 24 hours at −5° C. with slowly dropping it into a solution which is made by putting 18.4 g of cyanuric chloride into a round bottom flask and then dissolving it into 200 ml of anhydrous tetrahydrofuran as mentioned in (1) of the embodiment 1-1. After the reaction, tetrahydrofuran is removed by distillation under reduced pressure, and then remained solids are dissolved again into chloroform. This solution is washed three times with distilled water at a separating funnel to extract impurities, and then water is removed by calcium chloride. The solution is then distilled under reduced pressure to remove chloroform, and then recrystallized with a mixed solvent of methylene chloride and n-hexane. The recrystallized material is filtered under reduced pressure and then dried under vacuum to obtain triazine derivative having a coumarin functional group.

(2) Synthesis of a Triazine Monomer having Diamine Functional Group 31.1 g of the triazine derivative having a coumarin photoinduced functional group synthesized in a way of (1) of the embodiment 1-3 is put into a round bottom flask and dissolved by 300 ml of chloroform. 32.8 g of 4-aminophenol and 12 g of sodium hydroxide are dissolved in 300 ml of distilled water to which 3 g of cetyltrimethylammonium bromide is dissolved, and then they are mixed with the above triazine derivative solution and severely reacted for 24 hours. After the reaction, organic solution phase is separated and moved to a separating funnel and washed three times with distilled water to extract impurities. And then, water is removed by calcium chloride. The solution free from water is distilled under reduced pressure to remove chloroform which is an organic solvent, and then recrystallized in a mixed solvent of methylene chloride and n-hexane. The deposited crystal is filtered under reduced pressure and then dried under vacuum to obtain a triazine monomer.

(3) Polymerization of Polyamide Polymer for Photoinduced Liquid Crystal Alignment having a Coumarin Chromophore 45.54 g of the triazine monomer obtained in the way of (2) of the embodiment 1-3 is put into a round bottom flask filled with nitrogen and dissolved by 400 ml of anhydrous tetrahydrofuran, and then 20.24 g of triethylanmine is added to the solution. 20.3 g of terephthaloyl chloride is dissolved in 100 ml of anhydrous tetrahydrofuran, and then with slowly dropping it into the above-mentioned solution in which the triazine monomer and triethylamine are dissolved, the solution is severely stirred and reacted for 12 hours. After the reaction, the reaction solution is slowly poured into methanol for precipitation, filtering and drying a deposit under vacuum. The process for dissolving the obtained polymer again in tetrahydrofuran and then precipitating in methanol is repeated twice, and then it is dried under vacuum to finally obtain synthesized polyamide polymer for photoinduced liquid crystal alignment having a coumarin functional group with the use of a triazine ring.

(4) Fabrication of a Liquid Crystal Display Cell

A liquid display cell is made in a way of (6) of the embodiment 1-1 by use of the polyamide polymer for photoinduced liquid crystal alignment obtained in a way of (3) of the embodiment 1-3.

Experimental Example: Measurement of Liquid Crystal Display Cell Characteristics Electro-optical characteristic, thermal stability, optical stability, residual DC and VHR characteristics of the liquid crystal display cells made in a way of the embodiments 1-1 to 1-3 are measured, and its results are expressed in Tables 1, 2, 3 and 4.

Test 1: Change of a Pretilt Angle Depending on Thermal Treatment

As seen in the following Table 1, the polymer for photoinduced liquid crystal alignment of the embodiments have thermal stability, optical transparency and excellent coating ability, which are basic characteristics of conventionally used polyimide, together with superior mechanical characteristics which is peculiar to polyamide polymer. Thus, in case of making a photoalignment liquid crystal cell by use of the polymer for liquid crystal alignment according to the embodiments, a multi domain liquid crystal alignment can be easily obtained by simple processes. In addition, owing to dramatically improved alignment characteristics, for example that the pretilt angle of the liquid crystal is kept even after the seal baking which needs a high temperature, the cell can be applied to a liquid crystal display requiring high definition and wide viewing angle.

TABLE 1

|  | Embodiment 1-1 | Embodiment 1-2 | Embodiment 1-3 |
| --- | --- | --- | --- |
| Process | Light irradiation | Light irradiation | Light irradiation |
| Density | 8 wt % | 8 wt % | 8 wt % |

TABLE 1-continued

|  | Embodiment 1-1 | Embodiment 1-2 | Embodiment 1-3 |
| --- | --- | --- | --- |
| Pretilt Angle |  |  |  |
| Room Temperature | 0~5° | 0~3° | 0~4° |
| After Thermal Treatment | 0~5° | 0~3° | 0~4° |
| Contrast Ratio | 195 | 190 | 190 |

Note 1. The pretilt angle is measured using a crystal angle rotation manner.
Note 2. The heat treatment is executed for 3 minutes at 150° C. which is a seal baking temperature.

Test 2: Thermal Stability

Thermal stability of the liquid crystal cell is measured as follows. After measuring an initial pretilt angle of the liquid crystal cell, a change of the pretilt angle depending on time is measured at a room temperature with thermal-aging the liquid crystal cell at 150° C. In case the thermal stability of alignment is unstable, the pretilt angle changes depending on time, while when stable, the pretilt angle hardly changes. Results of the test are expressed in the following Table 2. As well understood from Table 2, the photoalignment agents according to the embodiments have so excellent thermal stability to keep the alignment and the pretilt angle of the liquid crystal stably even during long time thermal aging, thereby satisfying basic characteristics for a liquid crystal display.

TABLE 2

|  | Embodiment 1-1 | Embodiment 1-2 | Embodiment 1-3 |
| --- | --- | --- | --- |
| Pretilt Angle | ~5° | ~4° | ~4° |
| Thermal Aging Temperature | 150° C. | 150° | 150° |
| Thermal Aging Time | 48 hours | 48 hours | 48 hours |
| Pretilt Angle Change | No | No | No |

Test 3: Optical Stability

The liquid crystal cells are made according to the embodiments 1-1, 1-2 and 1-3 and their optical stability is measured. For the measurement of optical stability, light in a range of ultraviolet and visible rays is irradiated on the alignment surface of one cell, and then a change of the alignment characteristics is check by the eyes with the use of a polarizer for irradiated surface and non-irradiated surface. The measurement results are expressed in the following Table 3. In case the cell has insufficient optical stability, the light irradiated to a liquid crystal cell induces a change of the liquid crystal alignment characteristic on the irradiated surface. Thus, the alignment characteristic of the irradiated surface is significantly changed different from that of the non-irradiated surface or destroyed so that the liquid crystal alignment is mingled unspecifically. Therefore, this cell showing a change of the alignment characteristic cannot be used as a display device.

TABLE 3

|  |  | Embodiment 1-1 | Embodiment 1-2 | Embodiment 1-3 |
|---|---|---|---|---|
| Amount of Irradiated Light | 0.5 J/cm² | No Change | No Change | No Change |
|  | 1 J/cm² | No Change | No Change | No Change |
|  | 2 J/cm² | No Change | No Change | No Change |
| Angle of Irradiated Light | 90° | No Change | No Change | No Change |
|  | 80° | No Change | No Change | No Change |
|  | 70° | No Change | No Change | No Change |

Test 4: Residual DC and Voltage Holding Ratio(VHR)

A DC voltage is applied to both ends of the liquid crystal cell with changing in a range of −10 V~10 V and its electrostatic capacitance is measured. The residual DC is obtained from a size of the hysteretic value of the electrostatic capacitance. The liquid crystal cell is a TN-structure specimen having a thickness of 4~6 μm and prepared according to the manufacturing methods specified in the above-mentioned embodiments 1-1 to 1-3. Two electrodes of the prepared liquid crystal cell is connected to an LCD meter (i.e., Fluke 6306), and a change of its electrostatic capacitance at 1 kHz is recorded with changing the DC voltage from 0 V to 10 V, 0 V and −10 V. Hysteresis of the electrostatic capacitance change depending on the voltage is obtained and used for measuring a residual DC. In order to obtain the voltage holding ratio (VHR), pulses having a duration of 64 μs in ±1 Volt, 60 Hz period are applied and then a ratio that a voltage initially applied is maintained is measured. Its results are shown in the following Table 4. As seen in Table 4, the measurement results show low residual DC in a range of 10~13 mV at 20° C., and high VHR in a range of 98~99%, for all of three cells. This shows that the photoalignment agent according to the embodiments 1-1 to 1-3 satisfies the basic characteristics capable of being used as a liquid crystal display device.

TABLE 4

|  |  | Embodiment 1-1 | Embodiment 1-2 | Embodiment 1-3 |
|---|---|---|---|---|
| R-DC | 20° C. | 10 mV | 11 mV | 13 mV |
|  | 60° C. | 30 mV | 35 mV | 33 mV |
| VHR | 20° C. | 99% | 99% | 98% |
|  | 60° C. | 98% | 96% | 97% |

Second Embodiment

In the second embodiment, a general formula of the polymer is as shown in Chemical Formula 13.

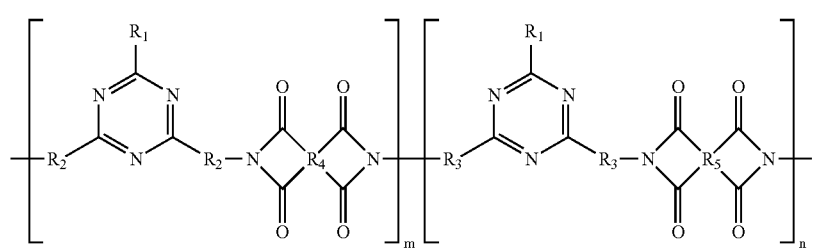

Chemical Formula 13

$(m + n = 1, 0 \leq m \leq 1, \text{ and } 0 \leq n \leq 1)$

In the Chemical Formula 13, $R_1$ is identical to that of the first embodiment.

However, in the Chemical Formula 13, the imide linkage connecting $R_2$, $R_3$ to $R_4$, $R_5$ (i.e., $R_2$ to $R_4$, $R_2$ to $R_5$, $R_3$ to R4, and $R_3$ to $R_5$) is obtained by the reaction of amine and carboxylic acid dianhydride, which is generally represented with the following Reaction Formula 2.

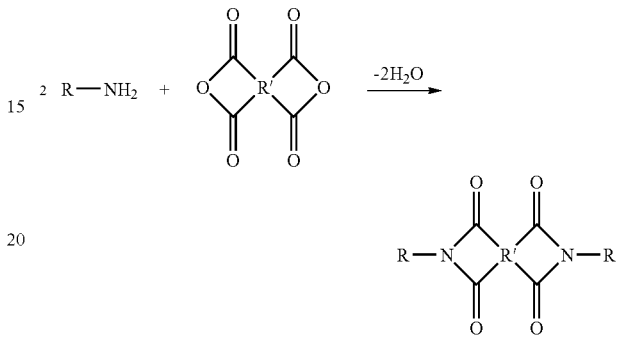

Reaction Formula 2

In the reaction formula 2, R and R' are organic groups respectively. As shown in the above imide product, R is derived from amine compound, which is related to $R_2$ or $R_3$ in the Chemical Formula 13. Additionally, R' is derived from carboxylic acid dianhydride compound, which is related to $R_4$ or $R_5$ in the Chemical Formula 13.

$R_2$ and $R_3$ of the above Chemical Formula 13 are amine moieties respectively derived from one selected from the group consisting of the following Chemical Formula 14.

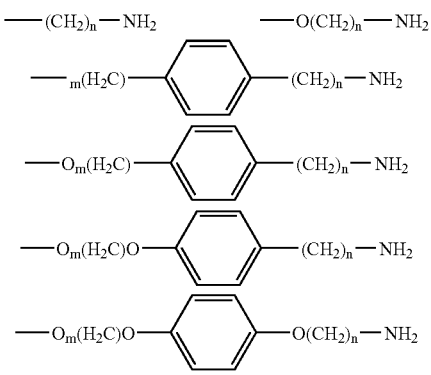

Chemical Formula 14

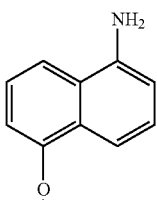

(Here, m and n are 0~10, respectively.)

In addition, R₄ and R₅ of the above Chemical Formula 13 are carboxylic acid dianhydride moieties respectively derived from one selected from the group consisting of the following Chemical Formula 15.

Chemical Formula 15

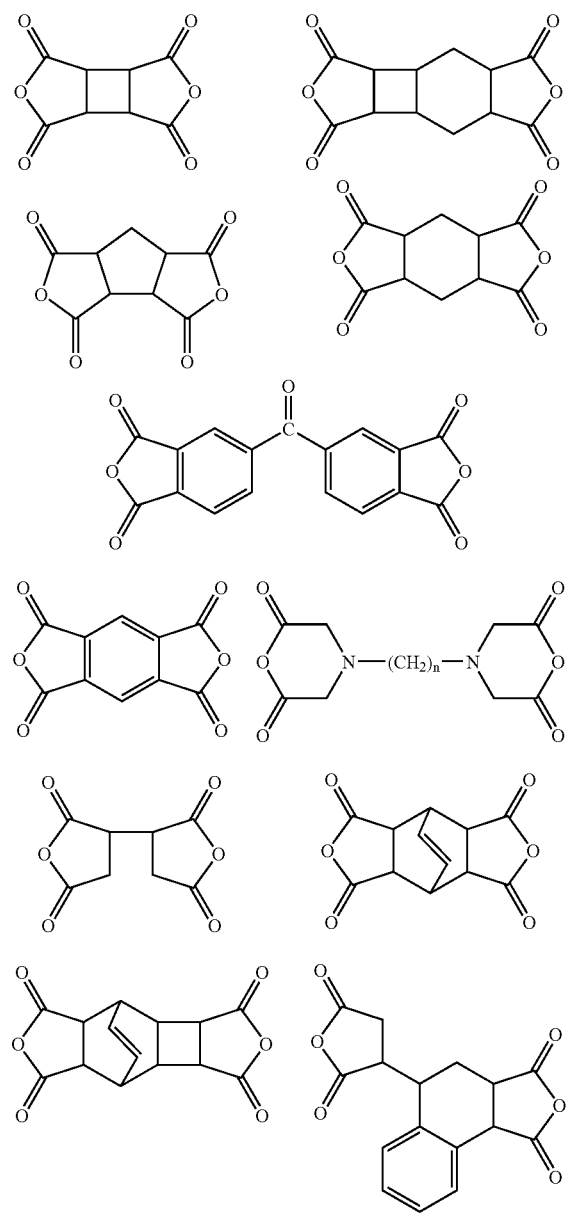

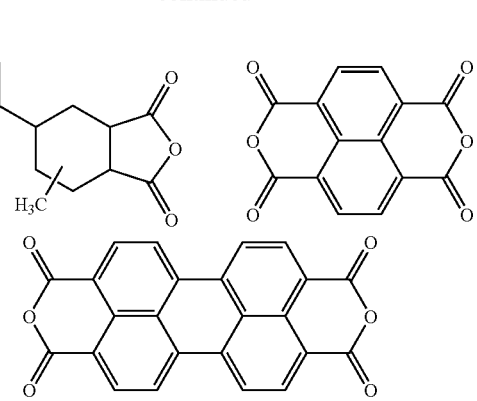

In addition, the benzene ring structure included in $R_1$, $R_2$, $R_3$, $R_4$ and $R_5$, represented by the Chemical Formulas 2 to 8, 14 and 15, in the polymer of the Chemical Formula 13 may have not only the above-described para-structure but also ortho- or meta-structure or a mixing structure of ortho-, meta- and para-.

The polyimide polymer represented by the above Chemical Formula 13 according to this embodiment of the present invention has at least one photoactive group, as in the case of the first embodiment. One of the photoactive groups may experience photodegradation, another group may experience Fires rearrangement, and other groups may experience photodimerization, photoisomerization or photocrosslinking for the purpose of reinforcement, changing or preserving of the generated alignment.

An agent for photoinduced liquid crystal alignment including the polymer represented by the Chemical Formula 13 according this embodiment has substantially identical characteristics and applications to the first embodiment.

In addition, a method for making a liquid crystal alignment layer by use of the polyimide polymer for photoinduced liquid crystal alignment according to this embodiment is substantially identical to the method for making a liquid crystal alignment layer by use of the polyamide polymer for photoinduced liquid crystal alignment according to the first embodiment.

Hereinafter, the second embodiment is described in more detail with the use of more concrete embodiments. The following embodiments are used for exemplifying concrete realizing modes of the present invention, and they should be not interpreted to limit or restrict the scope of the invention.

Embodiment 2-1

A polyimide polymer for photoinduced liquid crystal alignment having a cinnamate chromophore.

(1) Reforming of Triazine Ring 27.1 g of 4(2-tetrahydropyranyl methoxy)bromobenzene is dissolved into 250 ml of anhydrous tetrahydrofuran in three-neck flask filled with nitrogen, and then made to react upon 3 g of magnesium for 24 hours. This solution is reacted at −20° C. for 12 hours in a three-neck flask filled with nitrogen while slowly dropping 18.4 g of cyanuric chloride into 200 ml of anhydrous tetrahydrofuran.

After the reaction, the reaction solution is decompressed at a room temperature to remove the tetrahydrofuran, and then dissolved in ethylacetate. After mixing this solution with basic solution and severely agitating it to extract impurities, aqueous phase is separated and removed from the solution, and then the solution is decompressed at a room temperature to remove ethylacetate.

The solid phase material remaining after the removal of solvent is recrystallized in n-hexane to obtain 2-(4-(2-tetrahydropyranylmethoxy)phenyl)-4, 6-dichloro- 1, 3, 5-triazine.

(2) Introduction of a Hydroxy Functional Group into a Triazine Ring

After putting 34.0 g of the material obtained in (1) of the embodiment 2-1 into a round bottom flask and then dissolving it with 300 ml of tetrahydrofuran, 0.3 g of pyridinum-paratoluene-sulfonate is additionally put into the flask and 50 ml of ethanol is added for reaction during 24 hours.

After the reaction, the solvent is removed by distillation under reduced pressure, and then remained solids are dissolved again by methylene-chloride and then blended with distilled water in a separating funnel to extract impurities twice. Calcium chloride is put into the methylene chloride solution to remove water, and then the solvent is removed again through distillation under reduced pressure. This solid phase is recrystallized in a mixed solvent of methylene chloride and n-hexane to obtain 2-(4-hydroxyphenyl)-4, 6-dichloro- 1, 3, 5-triazine.

(3) Synthesis of a Triazine Ring Having Cinnamate Chromophore

Put 25.6 g of the triazine derivative obtained in (2) of the embodiment 2-1 into a round bottom flask filled with nitrogen and then dissolve it by putting 200 ml of anhydrous tetrahydrofuran. After adding 15.2 g of triethylamine to this solution and then lowering the temperature of the solution to −50° C., the solution is severely stirred and reacted for 12 hours with slowly dropping a cinnamoyl chloride solution diluted by putting 100 ml of anhydrous tetrahydrofuran into 25 g of cinnamoyl chloride.

After the reaction, the reacted solution is distilled under reduced pressure to remove tetrahydrofuran, and then the solution is dissolved by methylene chloride, passes through a filter filled with silica gels and is then distilled under reduced pressure to remove the solvent.

Finally, after recrystallization in an 1:1 mixed solvent of methylene chloride and n-hexane, the solution is filtered under reduced pressure. The obtained solid phase material is dried under vacuum to obtain a triazine derivative having a cinnamate chromophore.

(4) Synthesis of a Triazine Monomer Having Diamine Functional Group 38.6 g of the triazine derivative obtained in a way of (3) of the embodiment 2-1 is put into a round bottom flask and dissolved by 400 ml of chloroform. 32.8 g of 4-aminophenol and 12 g of sodium hydroxide are dissolved in 300 ml of distilled water to which 3 g of cetyltrimethylammonium bromide is dissolved, and then they are mixed with the above triazine derivative solution and severely reacted for 24 hours. After the reaction, organic solution phase is separated, and the reacted solution is moved to a separating funnel and washed three times with distilled water to extract impurities, and then water is removed by calcium chloride. The solution is distilled under reduced pressure to remove chloroform which is an organic solvent, and then recrystallized in a mixed solvent of methylene chloride and n-hexane.

The deposited crystal is filtered under reduced pressure and then dried under vacuum to obtain a triazine monomer.

(5) Polymerization of Polyimide Polymer for Photoinduced Liquid Crystal Alignment Having a Cinnamate Functional Group 53.156 g of the triazine monomer obtained in the way of (4) of the embodiment 2-1 is put into a round bottom flask filled with nitrogen and dissolved by 400 ml of N-methyl-pyrrolidone. 21.8 g of 1, 2, 4, 5-benzenetetracarboxylic acid dianhydride is dissolved in 100 ml of N-methyl-pyrrolidone, and then with slowly dropping it into the above-mentioned solution in which the triazine monomer are dissolved, the solution is severely stirred and reacted for 24 hours.

After the reaction, the reaction solution is slowly poured into methanol for precipitation, filtering and drying a deposit under vacuum. The process for dissolving the obtained polymer again in N-methyl-pyrrolidone and then precipitating in methanol is repeated twice, and then it is dried under vacuum to finally obtain synthesized polyamic acid which is a precursor of a polyimide polymer for liquid crystal alignment having a cinnamate functional group with the use of a triazine ring.

(6) Fabrication of a Liquid Crystal Display Cell

The obtained photoalignment agent is dissolved in a mixed solution of NMP and butylcellusolve to have a density of 8 wt%, and then passes through a filtration membrane having a pore size of 0.1 μm so as to eliminate impurity particles. This solution is printed in a thickness of about 300 nm on a glass substrate coated with transparent electrodes for the purpose of coating the photoalignment agent, and then the glass substrate is dried during about 1 hour at about 200° C. in order to remove the solvent with completing imidization reaction. Then, complex photoreactions such as photopolymerization of cinnamate group or photodegradation of polymer chain are induced to the glass substrate by irradiating ultraviolet rays of 500 W mercury lamp to the glass substrate one time per 2 seconds~10 minutes at an angle of 20°, thereby making a liquid crystal alignment layer containing polymer. Spacers having a size of 4~5 μm are sprayed on two glass substrates, and then the glass substrates are attached using epoxy adhesive to have a cell gap of 4~5 μm. This cell experiences a hardening process at 130° C. for 1 hour in order to harden the epoxy adhesive, so a cell in which two glass substrates are absolutely adhered is manufactured. Liquid crystal is injected into the manufactured cell, and the cell experiences one time a heat treatment process for heating at 100~130° C. during 1 hour and then cooling to an ambient temperature. Then, a liquid display cell is finally obtained.

Embodiment 2-2

A polyimide polymer for photoinduced liquid crystal alignment having a chalcone chromophore (1) Synthesis of Chalcone Chromophore 10 g of methoxy chalcone and 2.05 g of sodium cyanide are dissolved into 100 ml of dimethyl-sulfoxide, and then reacted during 24 hours. After the reaction, the reacted solution is mixed with chloroform and stirred together with distilled water so as to extract impurities. After removing the solution phase, the solution is decompressed at a room temperature in order to eliminate chloroform. After recrystallizing the remained solid phase in methanol, the solution is dried under vacuum, thus obtaining 4-hydroxychalcone for photoreaction.

(2) Introduction of a Chalcone into a Triazine Ring 23.8 g of 4-hydroxchalcone synthesized in a way of (1) of the embodiment 2-2 is put into a round bottom flask filled with nitrogen and then dissolved in 240 ml of anhydrous tetrahydrofuran. 2.4 g of sodium hydride (NaH) is added to the solution and reacted at room temperature for 6 hours. The solution is reacted at −5° C. for 24 hours by severely stirring with slowly dropping into a solution which is made by putting 18.4 g of triazine into a round bottom flask and then dissolving it into 200 ml of anhydrous tetrahydrofuran as mentioned in (1) of the embodiment 2-1. After the reaction, tetrahydrofuran is removed by distillation under reduced pressure, and then remained solids are dissolved again into chloroform. This solution is washed three times with distilled water at a separating funnel to extract impurities, and then water is removed by calcium chloride. The solution is then distilled under reduced pressure to remove chloroform, and then recrystallized with a mixed solvent of methylene chloride and n-hexane. The recrystallized material is filtered under reduced pressure and then dried under vacuum to obtain triazine derivative having chalcone functional group.

(3) Synthesis of a Triazine Monomer Having Diamine Functional Group 38.6 g of the triazine derivative having a chalcone functional group synthesized in a way of (2) of the embodiment 2-2 is put into a round bottom flask and dissolved by 400 ml of chloroform. In addition, 32.8 g of 4-aminophenol and 12 g of sodium hydroxide are dissolved in 300 ml of distilled water to which 3 g of cetyltrimethylammonium bromide is dissolved, and then they are mixed with the above triazine solution and severely reacted for 24 hours. After the reaction, organic solution phase is separated and moved to a separating funnel and washed three times with distilled water to extract impurities. And then, water is removed by calcium chloride. The solution free from water is distilled under reduced pressure to remove chloroform which is an organic solvent, and then recrystallized in a mixed solvent of methylene chloride and n-hexane. The deposited crystal is filtered under reduced pressure and then dried under vacuum to obtain a triazine monomer.

(4) Polymerization of Polyimide Polymer for Photoinduced Liquid Crystal Alignment Having a Chalcone Functional Group 53.15 g of the triazine monomer obtained in the way of (3) of the embodiment 2-2 is put into a round bottom flask filled with nitrogen and dissolved by 400 ml of N-methyl-pyrrolidone. 21.8 g of 1, 2, 4, 5-benzenetetracarboxylic acid dianhydride is dissolved in 100 ml of N-methyl-pyrrolidone, and then with slowly dropping it into the above-mentioned solution in which the triazine monomer are dissolved, the solution is severely stirred and reacted for 24 hours. After the reaction, the reaction solution is slowly poured into methanol for precipitation, filtering and drying a polymer under vacuum. The process for dissolving the obtained polymer again in N-methyl-pyrrolidone and then precipitating in methanol is repeated twice, and then it is dried under vacuum to finally obtain synthesized polyamic acid which is a precusor of a polyimide polymer for photoinduced liquid crystal alignment having a chalcone functional group with the use of a triazine ring.

(5) Fabrication of a Liquid Crystal Display Cell

A liquid display cell is made in a way of (6) of the embodiment 2-1 by use of the polyimide polymer for photoinduced liquid crystal alignment obtained in a way of (4) of the embodiment 2-2.

Embodiment 2-3

A polyimide polymer for photoinduced liquid crystal alignment having a coumarin chromophore (1) Introduction of a Coumarin Chromophore 16.2 g of 7-hydroxycoumarin and 2.4 g of sodium hydride (NaH) are put into a round bottom flask filled with nitrogen, and then they are dissolved into 160 ml of anhydrous tetrahydrofuran. After that, the solution is severely stirred and reacted for 6 hours. This solution is severely stirred and reacted for 24 hours at −5° C. with slowly dropping it into a solution which is made by putting 18.4 g of triazine into a round bottom flask and then dissolving it into 200 ml of anhydrous tetrahydrofuran as mentioned in (1) of the embodiment 2-1. After the reaction, tetrahydrofuran is removed by distillation under reduced pressure, and then remained solids are dissolved again into chloroform. This solution is washed three times with distilled water at a separating funnel to extract impurities, and then water is removed by calcium chloride. The solution is then distilled under reduced pressure to remove chloroform, and then recrystallized with a mixed solvent of methylene chloride and n-hexane. The recrystallized material is filtered under reduced pressure and then dried under vacuum to obtain triazine derivative having a coumarin functional group.

(2) Synthesis of a Triazine Monomer Having Diamine Functional Group 31.1 g of the triazine derivative having a coumarin functional group synthesized in a way of (1) of the embodiment 2-3 is put into a round bottom flask and dissolved by 300 ml of chloroform. 32.8 g of 4-aminophenol and 12 g of sodium hydroxide are dissolved in 400 ml of distilled water to which 3 g of cetyltrimethylammonium bromide is dissolved, and then they are mixed with the above triazine solution and severely reacted for 24 hours. After the reaction, organic solution phase is separated and moved to a separating funnel and washed three times with distilled water to extract impurities. And then, water is removed by calcium chloride. The solution is distilled under reduced pressure to remove chloroform which is an organic solvent, and then recrystallized in a mixed solvent of methylene chloride and n-hexane. The deposited crystal is filtered under reduced pressure and then dried under vacuum to obtain a triazine monomer.

(3) Polymerization of Polyimide Polymer for Photoinduced Liquid Crystal Alignment Having a Coumarin Functional Group 45.54 g of the triazine monomer obtained in the way of (2) of the embodiment 2-3 is put into a round bottom flask filled with nitrogen and dissolved by 400 ml of N-methyl-pyrrolidone. 21.8 g of 1, 2, 4, 5-benzenetetracarboxylic acid dianhydride is dissolved in 100 ml of N-methyl-pyrrolidone, and then with slowly dropping it into the above-mentioned solution in which the triazine monomer are dissolved, the solution is severely stirred and reacted for 24 hours. After the reaction, the reaction solution is slowly poured into methanol for precipitation, filtering and drying a polymer under vacuum. The process for dissolving the obtained polymer again in N-methyl-pyrrolidone and then precipitating in methanol is repeated twice, and then it is dried under vacuum to finally obtain synthesized polyamic acid which is a precusor of a polyimide polymer for photoinduced liquid crystal alignment having a coumarin functional group with the use of a triazine ring.

(4) Fabrication of a Liquid Crystal Display Cell

A liquid display cell is made in a way of (6) of the embodiment 2-1 by use of the polyimide polymer for photoinduced liquid crystal alignment obtained in a way of (3) of the embodiment 2-3.

Experimental Example: Measurement of Liquid Crystal Display Cell Characteristics Electro-optical characteristic, thermal stability, optical stability, residual DC and VHR characteristics of the liquid crystal display cells made in a way of the embodiments 2-1 to 2-3 are measured, and its results are expressed in the tables 5, 6, 7 and 8.

Test 1: Change of a Pretilt Angle Depending on Thermal Treatment

As seen in the following table 5, the polymer for photoinduced liquid crystal alignment of the embodiments have thermal stability, optical transparency and excellent coating ability, which are basic characteristics of conventionally used polyimide. In addition, since having the functional group, the polymer has an advantage that an amount of irradiated light required for alignment is reduced in comparison to the conventional polyimide alignment agent.

Thus, in case of making a photoalignment liquid crystal cell by use of the polymer for liquid crystal alignment according to the embodiments, a multi domain liquid crystal alignment can be easily obtained by simple processes. In addition, owing to dramatically improved alignment characteristics, for example that the pretilt angle of the liquid crystal is kept even after the seal baking which needs a high temperature, the cell can be applied to a liquid crystal display requiring high definition and wide viewing angle.

TABLE 5

| | Embodiment 2-1 | Embodiment 2-2 | Embodiment 2-3 |
| --- | --- | --- | --- |
| Process Density | Light irradiation 8 wt % | Light irradiation 8 wt % | Light irradiation 8 wt % |
| Pretilt Angle | | | |
| Room Temperature | 0~4° | 0~4° | 0~4° |
| After Thermal Treatment | 0~4° | 0~3° | 0~4° |
| Contrast Ratio | 195 | 190 | 190 |

Note 1. The pretilt angle is measured using a crystal angle rotation manner.
Note 2. The heat treatment is executed for 3 minutes at 150° C. which is a seal baking temperature.

Test 2: Thermal Stability

Thermal stability of the liquid crystal cell is measured as follows. After measuring an initial pretilt angle of the liquid crystal cell, a change of the pretilt angle depending on time is measured at a room temperature with thermal aging the liquid crystal cell at 200° C. In case the thermal stability of alignment is unstable, the pretilt angle changes depending on time, while when stable, the pretilt angle hardly changes. Results of the test are expressed in the following table 6. As well understood from the table 6, the photoalignment agents according to the embodiments have so excellent thermal stability to keep the alignment and the pretilt angle of the liquid crystal stably even during long time thermal aging, thereby satisfying basic characteristics for a liquid crystal display.

TABLE 6

| | Embodiment 2-1 | Embodiment 2-2 | Embodiment 2-3 |
| --- | --- | --- | --- |
| Pretilt Angle | ~4° | ~3° | ~4° |
| Thermal Aging Temperature | 200° C. | 200° | 200° |
| Thermal Aging Time | 48 hours | 48 hours | 48 hours |
| Pretilt Angle Change | No | No | No |

Test 3: Optical Stability

The liquid crystal cells are made according to the embodiments 2-1, 2-2 and 2-3 and their optical stability is measured. For the measurement of optical stability, light in a range of ultraviolet and visible rays is irradiated on the alignment surface of one cell, and then a change of the alignment characteristics is check by the eyes with the use of a polarizer for irradiated surface and non-irradiated surface. The measurement results are expressed in the following table 7. In case the cell has insufficient optical stability, the light irradiated to a liquid crystal cell induces a change of the liquid crystal alignment characteristic on the irradiated surface. Thus, the alignment characteristic of the irradiated surface is significantly changed different from that of the non-irradiated surface or destroyed so that the liquid crystal alignment is mingled unspecifically. Therefore, this cell showing a change of the alignment characteristic cannot be used as a display device.

TABLE 7

| | | Embodiment 2-1 | Embodiment 2-2 | Embodiment 2-3 |
| --- | --- | --- | --- | --- |
| Amount of Irradiated Light | 0.5 J/cm² | No Change | No Change | No Change |
| | 1 J/cm² | No Change | No Change | No Change |
| | 2 J/cm² | No Change | No Change | No Change |
| Angle of Irradiated Light | 90° | No Change | No Change | No Change |
| | 80° | No Change | No Change | No Change |
| | 70° | No Change | No Change | No Change |

Test 4: Residual DC and Voltage Holding Ratio(VHR)

A DC voltage is applied to both ends of the liquid crystal cell with changing in a range of −10 V~10 V and its electrostatic capacitance is measured. The residual DC is obtained from a size of the hysteretic value of the electrostatic capacitance. The liquid crystal cell is a TN-structure specimen having a thickness of 4~6 μm and prepared according to the manufacturing methods specified in the above-mentioned embodiments 2-1 to 2-3. Two electrodes of the prepared liquid crystal cell is connected to an LCD meter (i.e., Fluke 6306), and a change of its electrostatic capacitance at 1 kHz is recorded with changing the DC voltage from 0 V to 10 V, 0 V and −10 V. Hysteresis of the electrostatic capacitance change depending on the voltage is obtained and used for measuring a residual DC. In order to obtain the voltage holding ratio (VHR), pulses having a duration of 64 μs in ±1 Volt, 60 Hz period are applied and then a ratio that a voltage initially applied is maintained is measured. Its results are shown in the following table 8. As seen in Table 8, the measurement results show low residual DC in a range of 10~13 mV at 20° C., and high VHR in a range of 98~99%, for all of three cells. This shows that the photoalignment agent according to the embodiments 2-1 to 2-3 satisfies the basic characteristics capable of being used as a liquid crystal display device

TABLE 8

| | | Embodiment 2-1 | Embodiment 2-2 | Embodiment 2-3 |
| --- | --- | --- | --- | --- |
| R-DC | 20° C. | 8 mV | 10 mV | 10 mV |
| | 60° C. | 25 mV | 30 mV | 32 mV |
| VHR | 20° C. | 99% | 99% | 98% |
| | 60° C. | 99% | 98% | 97% |

Third Embodiment

In the third embodiment, a general formula of the polymer is as shown in Chemical Formula 16.

Chemical Formula 16

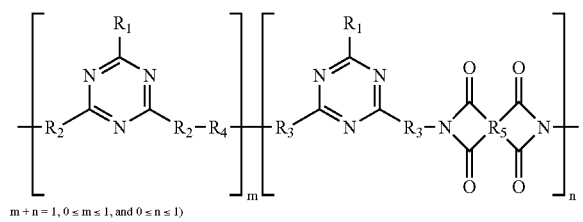

$m + n = 1, 0 \leq m \leq 1, \text{ and } 0 \leq n \leq 1$

In the Chemical Formula 16, $R_1$ is identical to those of the first embodiment and second embodiment.

In the Chemical Formula 16, the linkage connecting $R_2$, $R_3$ to $R_4$ (i.e., $R_2$ to $R_4$ and $R_3$ to $R_4$) is performed by the amide linkage obtained by the reaction of amine and carboxylic acid, which is generally represented with the following Reaction Formula 1.

Reaction Formula 1

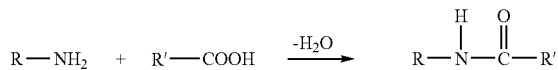

In the Reaction Formula 1, R and R' are organic groups respectively. As shown in the above amide product, R is derived from amine compound, which is related to $R_2$ or $R_3$ in the Chemical Formula 16. Additionally, R' is derived from carboxylic acid compound, which is related to $R_4$ in the Chemical Formula 16.

In the Chemical Formula 16, the linkage connecting $R_2$, $R_3$ to $R_5$ (i.e., $R_2$ to $R_5$ and $R_3$ to $R_5$) is performed by the imide linkage obtained by the reaction of amine and carboxylic acid dianhydride, which is generally represented with the following Reaction Formula 2.

Reaction Formula 2

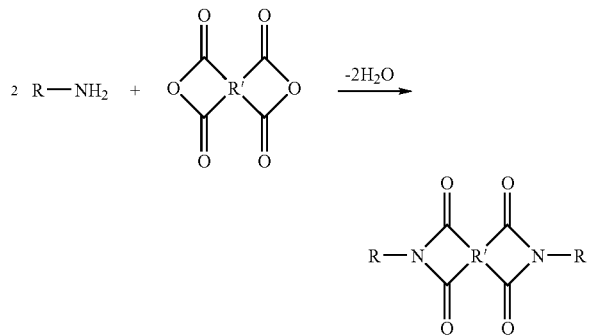

In the reaction formula 2, R and R' are organic groups respectively. As shown in the above imide product, R is derived from amine compound, which is related to $R_2$ or $R_3$ in the Chemical Formula 16. Additionally, R' is derived from carboxylic acid dianhydride compound, which is related to $R_5$ in the Chemical Formula 16.

Thus, the imide and the amide linkage, which are linkages of the Chemical Formula 16, are obtained by the reaction between amine and any of carboxylic acid and carboxylic acid dianhydride, which are represented by the Reaction Formula 1 and 2 respectively.

$R_2$ and $R_3$ of the above Chemical Formula 16 are amine moieties respectively derived from one selected from the Chemical Formula 14 respectively.

$R_4$ in the above Chemical Formula 16 is a carboxylic acid moiety selected from the Chemical Formula 12. $R_5$ in the above Chemical Formula 16 is carboxylic acid dianhydride moiety derived from one selected from the Chemical Formula 15.

In addition, any benzene ring structure included in $R_1$, $R_2$, $R_3$, $R_4$ and $R_5$, represented by chemical formulas 2 to 8, 12, 14 and 15, in the polymer of the Chemical Formula 16 may have not only the above-described para-structure but also ortho- or meta-structure or a mixing structure of ortho-, meta- and para-.

The poly(amide-imide) copolymer represented by the above Chemical Formula 16 according to this embodiment of the present invention has at least one photoactive group, as in the case of the first and second embodiments. One of the photoactive groups may experience photodegradation, another group may experience Fires rearrangement, and other groups may experience photodimerization, photoisomerization or photocrosslinking for the purpose of reinforcement, changing or preserving of the generated alignment.

In addition, the poly(amide-imide) copolymer can be used as a compatibilizer for suppressing phase separation when the polyamide alignment agent and the polyimide alignment agent are used together.

An agent for photoinduced liquid crystal alignment including the polymer represented by the Chemical Formula 16 according this embodiment has substantially identical characteristics and applications to the first embodiment.

In addition, a method for making a photoinduced liquid crystal alignment layer by use of the poly(amide-imide) copolymer for liquid crystal alignment according to this embodiment is substantially identical to the method for making a liquid crystal alignment layer by use of the polyamide polymer for photoinduced liquid crystal alignment according to the first embodiment and the method for making a photoinduced liquid crystal alignment layer by use of polyimide polymer for photoinduced liquid crystal alignment according to the second embodiment.

Hereinafter, the third embodiment is described in more detail with the use of more concrete embodiments. The following embodiments are used for exemplifying concrete realizing modes of the present invention, and they should be not interpreted to limit or restrict the scope of the invention.

Embodiment 3-1

A poly(amide-imide) polymer for photoinduced liquid crystal alignment having a cinnamate chromophore (1) Reforming of Triazine Ring 27.1 g of 4(2-tetrahydropyranyl methoxy)bromobenzene is dissolved into 250 ml of anhydrous tetrahydrofuran in three-neck flask filled with nitrogen, and then made to react upon 3 g of magnesium for 24 hours. This solution is reacted at −20° C. for 12 hours in a three-neck flask filled with nitrogen while slowly dropping 18.4 g of cyanuric chloride into 200 ml of anhydrous tetrahydrofuran.

After the reaction, the reaction solution is decompressed at a room temperature to remove the tetrahydrofuran, and then dissolved in ethylacetate. After mixing this solution with basic solution and severely stirring it to extract impurities, aqueous phase is separated and removed from the solution, and then the solution is decompressed at a room temperature to remove ethylacetate.

The solid phase material remaining after the removal of solvent is recrystallized in n-hexane to obtain 2-(4-(2-tetrahydropyranylmethoxy)phenyl)-4,6-dichloro-1,3,5-triazine.

(2) Introduction of a Hydroxy Functional Group Into a Triazine Ring

After putting 34.0 g of the material obtained in (1) of the embodiment 3-1 into a round bottom flask and then dissolving it with 300 ml of tetrahydrofuran, 0.3 g of pyridinum-paratoluene-sulfonate is additionally put into the flask and 50 ml of ethanol is added for reaction for 24 hours.

After the reaction, the solvent is removed by distillation under reduced pressure, and then remained solids are dissolved again by methylene-chloride and then blended with distilled water in a separating funnel to extract impurities twice. Calcium chloride is put into the methylene chloride solution to remove water, and then the solvent is removed again through distillation under reduced pressure. This solid phase is recrystallized in a mixed solvent of methylene chloride and n-hexane to obtain 2-(4-hydroxyphenyl)-4,6-dichloro-1,3,5-triazine.

(3) Synthesis of a Triazine Ring Having Cinnamate Chromophore

Put 25.6 g of the triazine derivative obtained in (2) of the embodiment 3-1 into a round bottom flask filled with nitrogen and then dissolve it by putting 200 ml of anhydrous tetrahydrofuran. After adding 15.2 g of triethylamine to this solution and then lowering the temperature of the solution to −5° C., the solution is severely stirred and reacted for 12 hours with slowly dropping a cinnamoyl chloride solution diluted by putting 100 ml of anhydrous tetrahydrofuran into 25 g of cinnamoyl chloride.

After the reaction, the reacted solution is distilled under reduced pressure to remove tetrahydrofuran, and then the solution is dissolved by methylene chloride, passes through a filter filled with silica gels and is then distilled under reduced pressure to remove the solvent.

Finally, after recrystallization in a 1:1 mixed solvent of methylene chloride and n-hexane, the solution is filtered under reduced pressure. The obtained solid phase material is dried under vacuum to obtain a triazine derivative having a cinnamate side chain.

(4) Synthesis of a Triazine Monomer Having Diamine Functional Group 38.6 g of the triazine derivative obtained in a way of (3) of the embodiment 3-1 is put into a round bottom flask and dissolved by 400 ml of chloroform. 32.8 g of 4-aminophenol and 12 g of sodium hydroxide are dissolved in 300 ml of distilled water to which 3 g of cetyltrimethylammonium bromide is dissolved, and then they are mixed with the above triazine solution and severely reacted for 24 hours. After the reaction, organic solution phase is separated, and the reacted solution is moved to a separating funnel and washed three times with distilled water to extract impurities, and then water is removed by calcium chloride. The solution free from water is distilled under reduced pressure to remove chloroform which is an organic solvent, and then recrystallized in a mixed solvent of methylene chloride and n-hexane.

The deposited crystal is filtered under reduced pressure and then dried under vacuum to obtain a triazine monomer.

(5) Polymerization of Poly(amide-imide) Polymer for Photoinduced Liquid Crystal Alignment Having a Cinnamate Functional Group 53.156 g of the triazine monomer obtained in the way of (4) of the embodiment 3-1 is put into a round bottom flask filled with nitrogen and then dissolved by 400 ml of tetrahydrofuran. 10.12 g of triethylamin is added to the solution.

After dissolving 10.15 g of terephthaloyl chloride in 100 ml of anhydrous tetrahydrofuran, the solution is severely stirred and reacted for 6 hours while slowly dropping it into a solution in which the above-mentioned triazine monomer and triethylamine are dissolved. This solution is additionally reacted for 6 hours while slowly dropping a solution, in which 10.9 g of 1,2,4,5-benzenetetracarboxylic acid dianhydride is dissolved in 100 ml of N-methyl-pyrrolidone, into the above solution.

After the reaction, the reaction solution is slowly poured into methanol for precipitation, filtering and drying a polymer under vacuum. The process for dissolving the obtained polymer again in tetrahydrofuran and then precipitating in methanol is repeated twice, and then it is dried under vacuum to finally obtain synthesized poly(amide-imide) copolymer for photoinduced liquid crystal alignment having a coumarin functional group with the use of a triazine ring.

(6) Fabrication of a Liquid Crystal Display Cell

The obtained photoalignment agent is dissolved in a mixed solution of NMP and butylcellusolve to have a density of 8 wt %, and then passes through a filtration membrane having a pore size of 0.1 μm so as to eliminate impurity particles. This solution is printed in a thickness of about 300 nm on a glass substrate coated with transparent electrodes for the purpose of coating the photoalignment agent, and then the glass substrate is dried during about 1 hour at about 200° C. in order to remove the solvent with completing imidization reaction. Then, complex photoreactions such as photopolymerization of cinnamate group or photodegradation of polymer chain are induced to the glass substrate by irradiating ultraviolet rays of 500 W mercury lamp to the glass substrate one time per 2 seconds~10 minutes at an oblique angle of 20°, thereby making a liquid crystal alignment layer containing polymer. Spacers having a size of 4~5 μm are sprayed on two glass substrates, and then the glass substrates are attached using epoxy adhesive to have a cell gap of 4~5 μm. This cell experiences a hardening process at 130° C. for 1 hour in order to harden the epoxy adhesive, so a cell in which two glass substrates are absolutely adhered is manufactured. Liquid crystal is injected into the manufactured cell, and the cell experiences one time a heat treatment process for heating at 100~130° C. during 1 hour and then cooling to an ambient temperature. Then, a liquid display cell is finally obtained.

Embodiment 3-2

A poly(amide-imide) polymer for photoinduced liquid crystal alignment having a chalcone chromophore (1) Synthesis of Chalcone Chromophore 10 g of methoxy chalcone and 2.05 g of sodium cyanide are dissolved into 100 ml of dimethyl-sulfoxide, and then reacted during 24 hours. After the reaction, the reacted solution is mixed with chloroform and stirred together with distilled water so as to extract impurities. After removing the solution phase, the solution is decompressed at a room temperature in order to eliminate chloroform. After recrystallizing the remained solid phase in methanol, the solution is dried under vacuum, thus obtaining side chain 4-hydroxychalcone for photoreaction.

(2) Introduction of a Chalcone Functional Group into a Triazine Ring 23.8 g of 4-hydroxchalcone synthesized in a way of (1) of the embodiment 3-2 is put into a round bottom flask filled with nitrogen and then dissolved in 240 ml of anhydrous tetrahydrofuran. 2.4 g of sodium hydride (NaH) is added to the solution and reacted at a room temperature for 6 hours. The solution is reacted at −5° C. for 24 hours by severely stirring with slowly dropping into a solution which is made by putting 18.4 g of triazine into a round bottom flask and then dissolving it into 200 ml of anhydrous tetrahydrofuran as mentioned in (1) of the embodiment 3-1. After the reaction, tetrahydrofuran is removed by distillation under reduced pressure, and then remained solids are dissolved again into chloroform. This solution is washed three times with distilled water at a separating funnel to extract impurities, and then water is removed by calcium chloride. The solution is then distilled under reduced pressure to remove chloroform, and then recrystallized with a mixed solvent of methylene chloride and n-hexane. The recrystallized material is filtered under reduced pressure and then dried under vacuum to obtain triazine derivative having chalcone functional group.

(3) Synthesis of a Triazine Monomer having Diamine Functional Group 38.6 g of the triazine derivative having a chalcone functional group synthesized in a way of (2) of the embodiment 3-2 is put into a round bottom flask and dissolved by 400 ml of chloroform. In addition, 32.8 g of 4-aminophenol and 12 g of sodium hydroxide are dissolved in 300 ml of distilled water to which 3 g of cetyltrimethylammonium bromide is dissolved, and then they are mixed with the above triazine solution and severely reacted for 24 hours. After the reaction, organic solution phase is separated and moved to a separating funnel and washed three times with distilled water to extract impurities. And then, water is removed by calcium chloride. The solution is distilled under reduced pressure to remove chloroform which is an organic solvent, and then recrystallized in a mixed solvent of methylene chloride and n-hexane. The deposited crystal is filtered under reduced pressure and then dried under vacuum to obtain a triazine monomer.

(4) Polymerization of Poly(amide-imide) Polymer for Photoinduced Liquid Crystal Alignment having a Chalcone Functional Group 53.15 g of the triazine monomer obtained in the way of (3) of the embodiment 3-2 is put into a round bottom flask filled with nitrogen and dissolved by 400 ml of anhydrous tetrahydrofuran. 10.12 g of triethylamine is added to the solution. 10.15 g of terephthaloil chloride is dissolved in 100 ml of anhydrous tetrahydrofuran, and then with slowly dropping it into the above-mentioned solution in which the triazine monomer and triethylamine are dissolved, the solution is severely stirred and reacted for 24 hours. While dropping a solution, in which 10.9 g of 1,2,4,5-benzenetetracarboxylic acid dianhydride is dissolved in 100 ml of N-methyl-pyrrolidone, the above-mentioned solution is additionally reacted for 6 hours. After the reaction, the reaction solution is slowly poured into methanol for precipitation, filtering and drying a polymer under vacuum. The process for dissolving the obtained polymer again in tetrahydrofuran and then precipitating in methanol is repeated twice, and then it is dried under vacuum to finally obtain synthesized poly(amide-imide) copolymer for photoinduced liquid crystal alignment having a chalcone functional group with the use of a triazine ring.

(5) Fabrication of a Liquid Crystal Display Cell

A liquid display cell is made in a way of (6) of the embodiment 3-1 by use of the poly(amide-imide) copolymer for photoinduced liquid crystal alignment obtained in a way of (4) of the embodiment 3-2.

Embodiment 3-3

A poly(amide-imide) polymer for photoinduced liquid crystal alignment having a coumarin chromophore (1) Introduction of a Coumarin Chromophore 16.2 g of 7-hydroxycoumarin and 2.4 g of sodium hydride (NaH) are put into a round bottom flask filled with nitrogen, and then they are dissolved into 160 ml of anhydrous tetrahydrofuran. After that, the solution is severely stirred and reacted for 6 hours. This solution is severely stirred and reacted for 24 hours at −5° C. with slowly dropping it into a solution which is made by putting 18.4 g of triazine into a round bottom flask and then dissolving it into 200 ml of anhydrous tetrahydrofuran as mentioned in (1) of the embodiment 3-1. After the reaction, tetrahydrofuran is removed by distillation under reduced pressure, and then remained solids are dissolved again into chloroform. This solution is washed three times with distilled water at a separating funnel to extract impurities, and then water is removed by calcium chloride. The solution is then distilled under reduced pressure to remove chloroform, and then recrystallized with a mixed solvent of methylene chloride and n-hexane. The recrystallized material is filtered under reduced pressure and then dried under vacuum to obtain triazine derivative having a coumarin functional group.

(2) Synthesis of a Triazine Monomer having Diamine Functional Group 31.1 g of the triazine derivative having a coumarin functional group synthesized in a way of (1) of the embodiment 3-3 is put into a round bottom flask and dissolved by 300 ml of chloroform. 32.8 g of 4-aminophenol and 12 g of sodium hydroxide are dissolved in 400 ml of distilled water to which 3 g of cetyltrimethylammonium bromide is dissolved, and then they are mixed with the above triazine solution and severely reacted for 24 hours. After the reaction, organic solution phase is separated and moved to a separating funnel and washed three times with distilled water to extract impurities. And then, water is removed by calcium chloride. The solution is distilled under reduced pressure to remove chloroform which is an organic solvent, and then recrystallized in a mixed solvent of methylene chloride and n-hexane. The deposited crystal is filtered under reduced pressure and then dried under vacuum to obtain a triazine monomer.

(3) Polymerization of Poly(amide-imide) Polymer for Photoinduced Liquid Crystal Alignment having a Coumarin Functional Group 45.54 g of the triazine monomer obtained in the way of (2) of the embodiment 3-3 is put into a round bottom flask filled with nitrogen and dissolved by 400 ml of tetrahydrofuran. 10.12 g of triethylamine is added to the solution. 10.15 g of terephthaloyl chloride is dissolved in 100 ml of anhydrous tetrahydrofuran, and then with slowly dropping it into the above-mentioned solution in which the triazine monomer and triethylamine are dissolved, the solution is severely stirred and reacted for 6 hours. While dropping a solution, in which 10.9 g of 1,2,4,5-benzenetetracarboxylic acid dianhydride is dissolved in 100 ml of N-methyl-pyrrolidone, the above-mentioned solution is additionally reacted for 6 hours. After the reaction, the reaction solution is slowly poured into methanol for precipitation, filtering and drying a polymer under vacuum. The process for dissolving the obtained polymer again in tetrahydrofuran and then precipitating in methanol is repeated twice, and then it is dried under vacuum to finally obtain synthesized polyamic acid which is a precursor of a poly(amide-imide) copolymer for photoinduced liquid crystal alignment having a coumarin functional group with the use of a triazine ring.

(4) Fabrication of a Liquid Crystal Display Cell

A liquid display cell is made in a way of (6) of the embodiment 3-1 by use of the poly(amide-imide) copolymer for liquid crystal alignment obtained in a way of (3) of the embodiment 3-3.

EXPERIMENTAL EXAMPLE

Measurement of Liquid Crystal Display Cell Characteristics

Electro-optical characteristic, thermal stability, optical stability, residual DC and VHR characteristics of the liquid crystal display cells made in a way of the embodiments 3-1 to 3-3 are measured, and its results are expressed in the tables 9, 10, 11 and 12.

Test 1: Change of a Pretilt Angle depending on Thermal Treatment

As seen in the following table 9, the polymers for photoinduced liquid crystal alignment of the embodiments have thermal stability, optical transparency and excellent coating ability, which are basic characteristics of conventionally used polyimide. Together with the excellent characteristics, the liquid crystal alignment agent is copolymerized with polyimide. In addition, since having the photoreactive functional group, the polymer has an advantage that an amount of irradiated light required for alignment is reduced in comparison to the conventional polyimide alignment agent. Thus, in case of making a photoalignment liquid crystal cell by use of the polymer for liquid crystal alignment according to the embodiments, a multi domain liquid crystal alignment can be easily obtained by simple processes. In addition, owing to dramatically improved alignment characteristics, for example that the pretilt angle of the liquid crystal is kept even after the seal baking which needs a high temperature, the cell can be applied to a liquid crystal display requiring high definition and wide viewing angle.

TABLE 9

|  | Embodiment 3-1 | Embodiment 3-2 | Embodiment 3-3 |
|---|---|---|---|
| Process Density | Light irradiation 8 wt % | Light irradiation 8 wt % | Light irradiation 8 wt % |
| Pretilt Angle |  |  |  |
| Room Temperature | 0~3° | 0~5° | 0~6° |
| After Thermal Treatment | 0~3° | 0~5° | 0~6° |
| Contrast Ratio | 196 | 194 | 193 |

Note 1. The pretilt angle is measured using a crystal angle rotation manner.
Note 2. The Thermal treatment is executed for 3 minutes at 150° C. which is a seal baking temperature.

Test 2: Thermal Stability

Thermal stability of the liquid crystal cell is measured as follows. After measuring an initial pretilt angle of the liquid crystal cell, a change of the pretilt angle depending on time is measured at a room temperature with Thermal-aging the liquid crystal cell at 200° C. In case the thermal stability of alignment is unstable, the pretilt angle changes depending on time, while when stable, the pretilt angle hardly changes. Results of the test are expressed in the following table 10. As well understood from the table 10, the photoalignment agents according to the embodiments have so excellent thermal stability to keep the alignment and the pretilt angle of the liquid crystal stably even during long time thermal aging, thereby satisfying basic characteristics for a liquid crystal display.

TABLE 10

|  | Embodiment 3-1 | Embodiment 3-2 | Embodiment 3-3 |
|---|---|---|---|
| Pretilt Angle | ~3° | ~5° | ~6° |
| Thermal Aging Temperature | 150° C. | 150° | 150° |
| Thermal Aging Time | 48 hours | 48 hours | 48 hours |
| Pretilt Angle Change | No | No | No |

Test 3: Optical Stability

The liquid crystal cells are made according to the embodiments 3-1, 3-2 and 3-3 and their optical stability is measured. For the measurement of optical stability, light in a range of ultraviolet and visible rays is irradiated on the alignment surface of one cell, and then a change of the alignment characteristics is check by the eyes with the use of a polarizer for irradiated surface and non-irradiated surface. The measurement results are expressed in the following table 11. In case the cell has insufficient optical stability, the light irradiated to a liquid crystal cell induces a change of the liquid crystal alignment characteristic on the irradiated surface. Thus, the alignment characteristic of the irradiated surface is significantly changed different from that of the non-irradiated surface or destroyed so that the liquid crystal alignment is mingled unspecificably. Therefore, this cell showing a change of the alignment characteristic cannot be used as a display device.

TABLE 11

|  |  | Embodiment 3-1 | Embodiment 3-2 | Embodiment 3-3 |
|---|---|---|---|---|
| Amount of Irradiated Light | 0.5 J/cm² | No Change | No Change | No Change |
|  | 1 J/cm² | No Change | No Change | No Change |
|  | 2 J/cm² | No Change | No Change | No Change |
| Angle of Irradiated Light | 90° | No Change | No Change | No Change |
|  | 80° | No Change | No Change | No Change |
|  | 70° | No Change | No Change | No Change |

Test 4: Residual DC and Voltage Holding Ratio(VHR)

A DC voltage is applied to both ends of the liquid crystal cell with changing in a range of −10 V~10 V and its electrostatic capacitance is measured. The residual DC is obtained from a size of the hysteretic value of the electrostatic capacitance. The liquid crystal cell is a TN-structure specimen having a thickness of 4~6 μm and prepared according to the manufacturing methods specified in the above-mentioned embodiments 3-1 to 3-3. Two electrodes of the prepared liquid crystal cell is connected to an LCD meter (i.e., Fluke 6306), and a change of its electrostatic capacitance at 1 kHz is recorded with changing the DC voltage from 0 V to 10 V, 0 V and −10 V. Hysteresis of the electrostatic capacitance change depending on the voltage is obtained and used for measuring a residual DC. In order to obtain the voltage holding ratio (VHR), pulses having a duration of 64 μs in ±1 Volt, 60 Hz period are applied and then a ratio that a voltage initially applied is maintained is measured. Its results are shown in the following table 12. As seen in Table 8, the measurement results show low residual DC in a range of 10~13 mV at 20° C., and high VHR in a range of 98~00%, for all of three cells. This shows that the photoalignment agent according to the embodiments 3-1 to 3-3 satisfies the basic characteristics capable of being used as a liquid crystal display device.

TABLE 12

|  |  | Embodiment 3-1 | Embodiment 3-2 | Embodiment 3-3 |
|---|---|---|---|---|
| R-DC | 20° C. | 9 mV | 12 mV | 12 mV |
|  | 60° C. | 26 mV | 28 mV | 30 mV |
| VHR | 20° C. | 99% | 99% | 99% |
|  | 60° C. | 99% | 98% | 97% |

INDUSTRIAL APPLICABILITY

As described above, the present invention provides polyamide, polyimide and poly(amide-imide) polymers for photoinduced liquid crystal alignment for photopolymerization and photolysis to which an optical reaction group such as cinnamate, coumarin, calcone and maleimide is introduced by using triazine derivatives as a main chain and an alignment layer using the polymers, so the present invention may overcome the problems such as low thermal stability, poor alignment ability caused by weak physical binding force between a liquid crystal and an alignment layer and susceptibility to the optical stability during a cell making process, which are possessed by the conventional photo-alignment agent using a hydrocarbon polymer such as polyolefin as a main chain. In addition, the polymers according to the present invention may be provided with not only optical transparency and chemical resistance but also excellent mechanical properties and heat resistance which are peculiar to polyamide, polyimide and poly(amide-imide) polymers. Thus, the liquid crystal display elements made using the polymer for photoinduced liquid crystal alignment according to the present invention may realize high quality display.

Changes or modifications of the present invention can be easily performed to those skilled in the art, and it should be understood that those changes and modifications are included in the scope of the present invention.

What is claimed is:

1. A liquid crystal alignment agent containing triazine ring based polymer expressed by the following chemical formula (1):

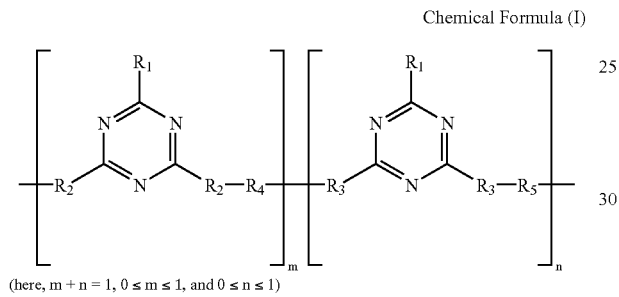

Chemical Formula (I)

(here, m + n = 1, 0 ≤ m ≤ 1, and 0 ≤ n ≤ 1)

wherein $R_1$ in the Chemical Formula (I) is one selected from the following formula (1a) to (4a):

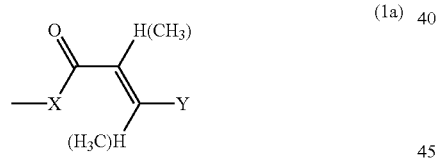
(1a)

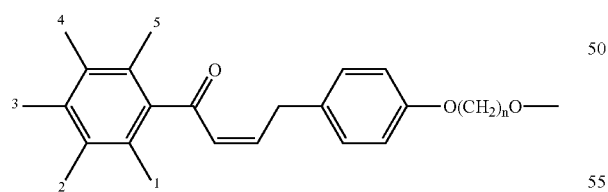
(2a)

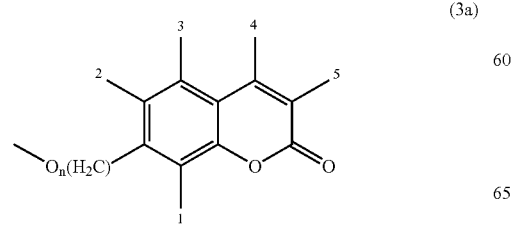
(3a)

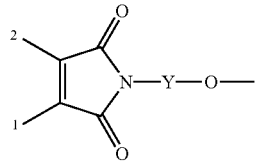
(4a)

wherein X in the above formula (1a) is one selected from the following formula:

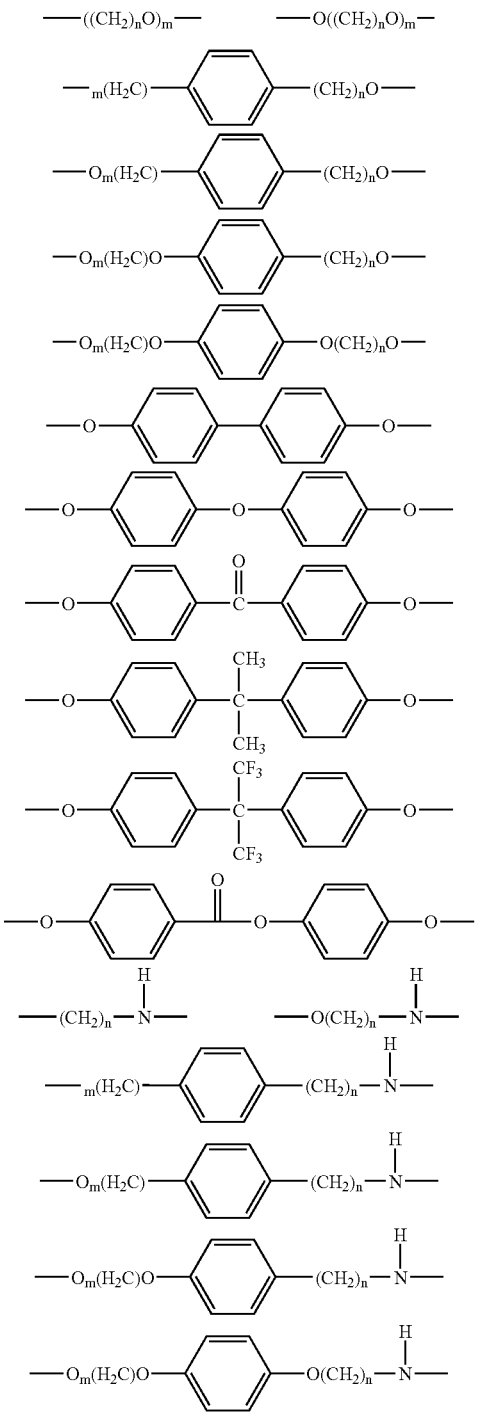

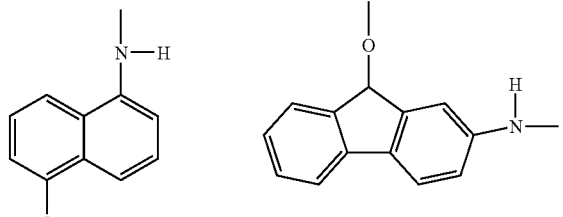

(here, m and n are 0~10, respectively)

wherein Y in the formula (1a) is one selected from the following formula:

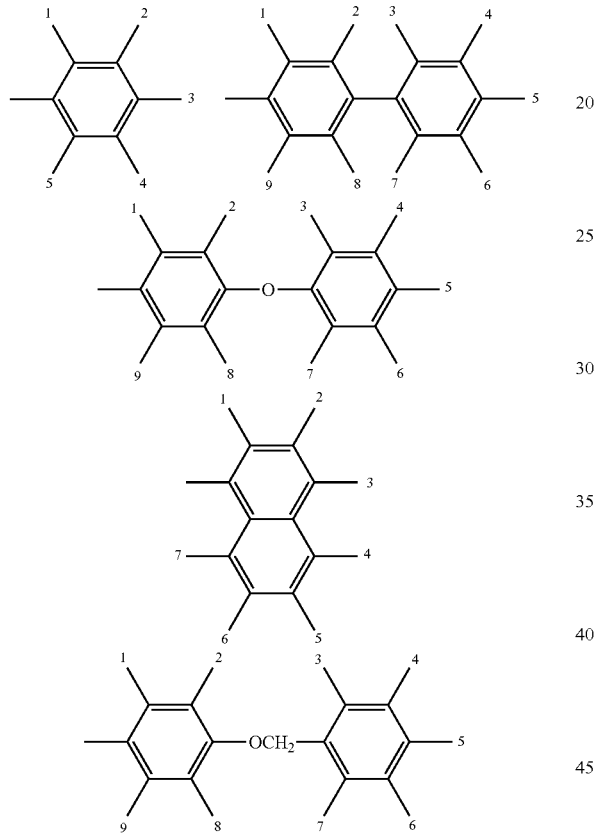

wherein the numerals 1, 2, 3, 4, 5, 6, 7, 8 or 9 in the above formulas is one selected from the following formula:

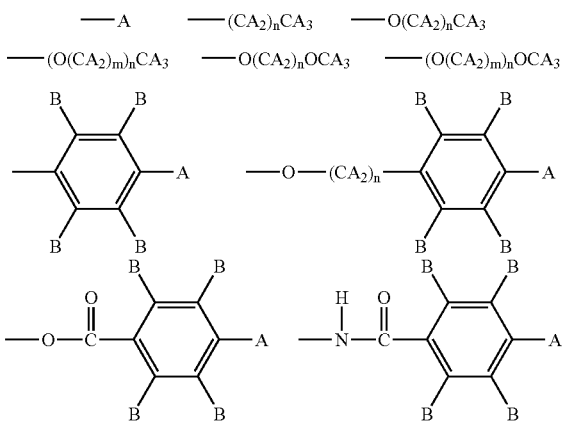

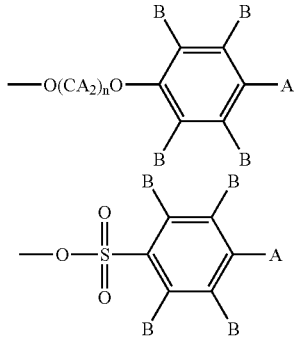

wherein in the above formula (2a) and (3a), n is 0~10, and the numerals 1, 2, 3, 4 and 5 are respectively selected from the following formula:

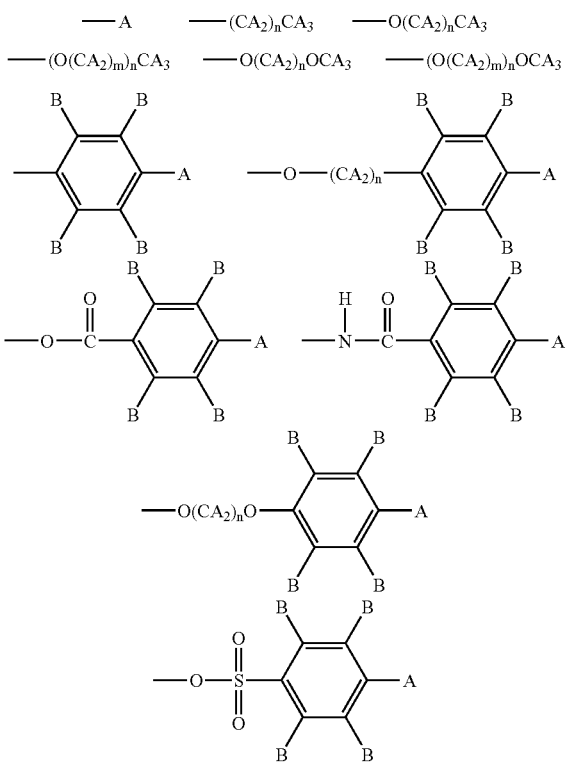

(here, m and n are 0~10 respectively, and A and B are respectively H, F, Cl, CN, $CF_3$ or $CH_3$)

wherein Y in the above formula (4a) is one selected from the following formula:

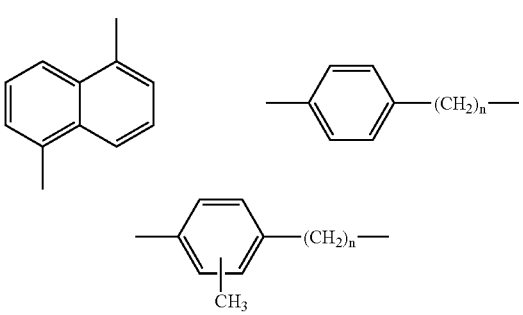

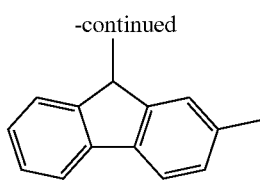

(here, n is 0~10)

wherein the numerals 1 and 2 in the above formula (4a) are respectively selected from the following formula:

 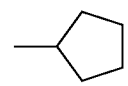 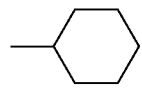

(here, A is H, F, CH₃, CF₃, or CN)

wherein $R_2$ and $R_3$ in the Chemical Formula (I) are respectively based on one amine selected from the following formula:

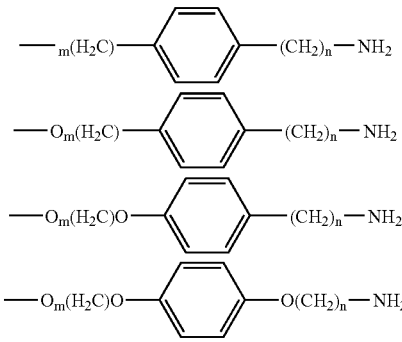

(here, m and n are 0~10 respectively)

wherein $R_4$ and $R_5$ in the above Chemical Formula (I) are respectively based on one carboxylic acid derivative or carboxylic acid dianhydride selected from the following formula:

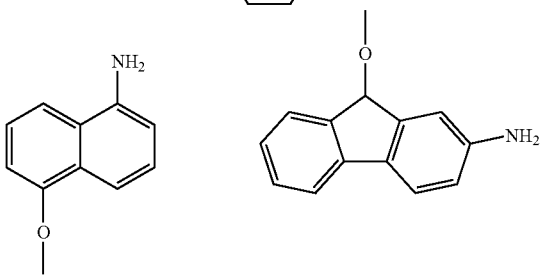

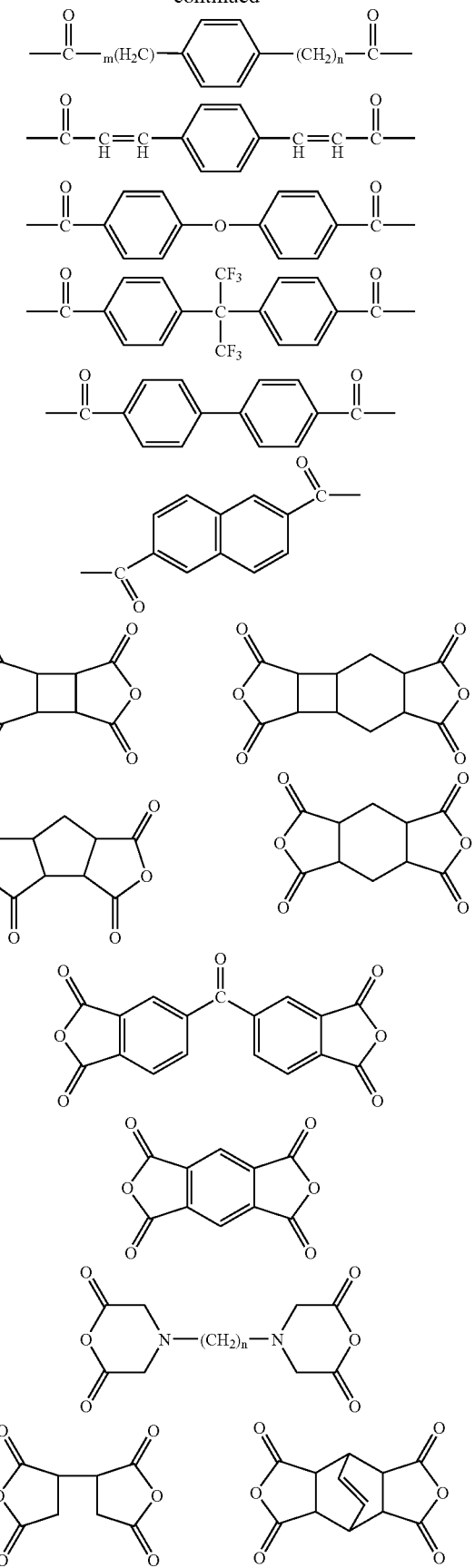

-continued

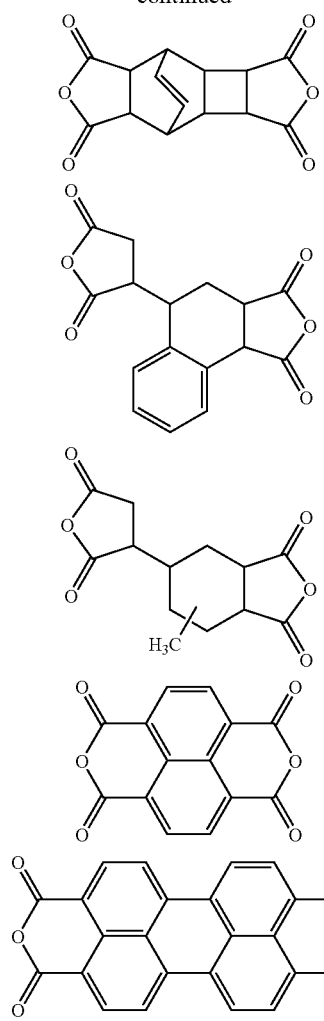

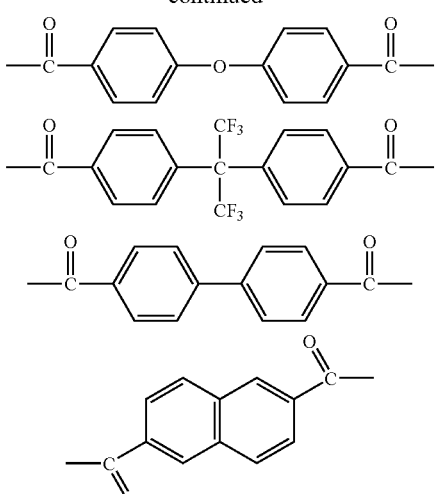

(here, m and n are respectively 0~10.)

3. A liquid crystal alignment agent according to claim 1, wherein $R_4$ and $R_5$ in the Chemical Formula (I) are carboxylic acid dianhydride moieties respectively derived from one selected from the group consisting of the following formulas:

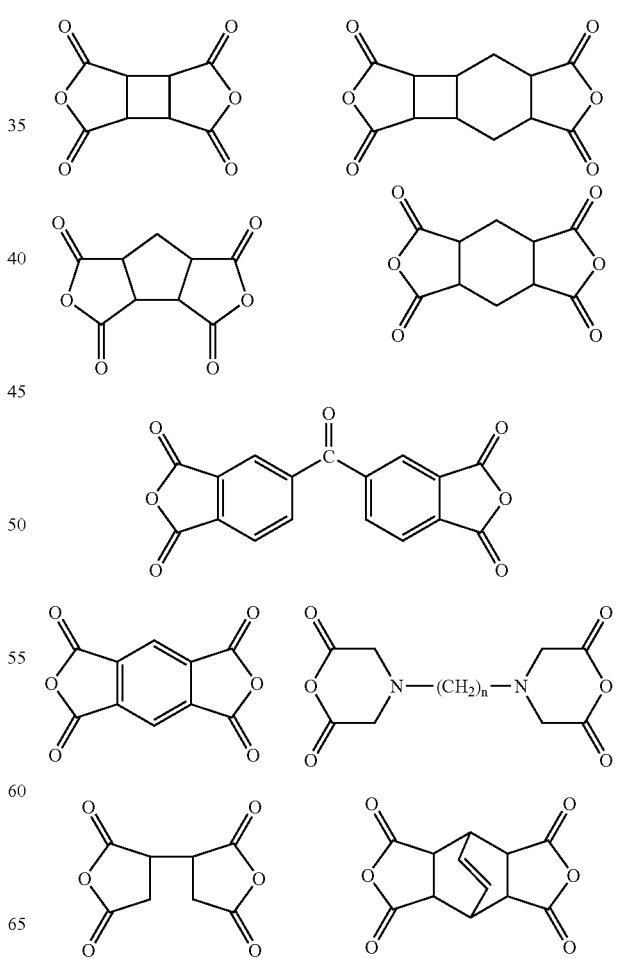

2. A liquid crystal alignment agent according to claim 1, wherein $R_4$ and $R_5$ in the Chemical Formula (I) are carboxylic acid moieties respectively selected from the group consisting of the following formulas:

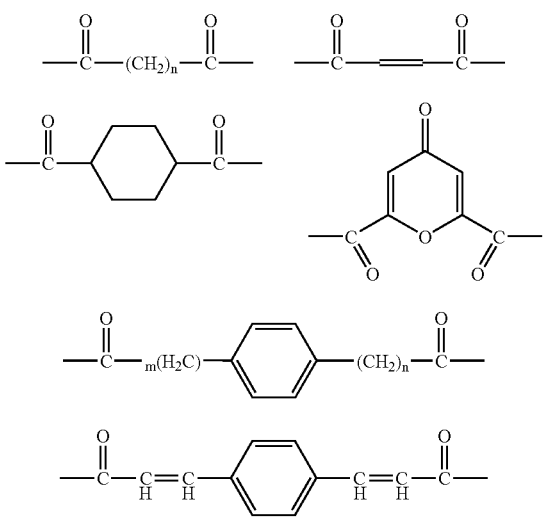

-continued
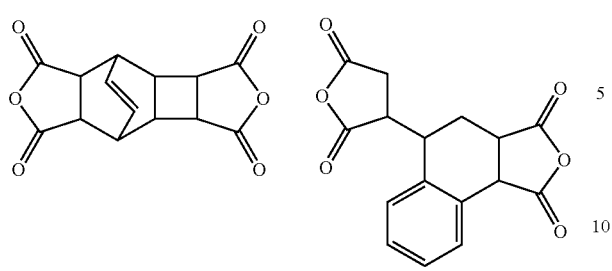
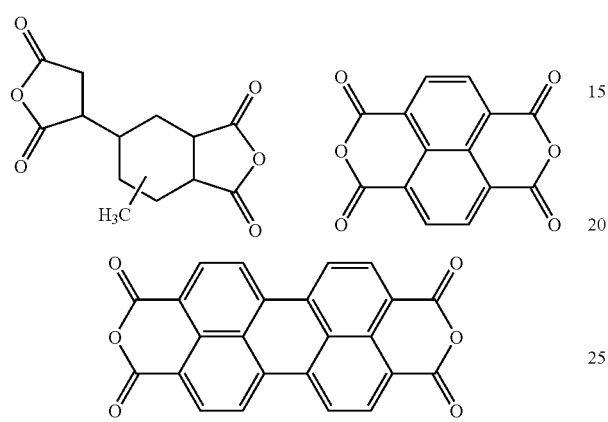
4. A liquid crystal alignment agent according to claim 1, wherein $R_4$ in the Chemical Formula (I) is a carboxylic acid moiety selected from the group consisting of the following formulas:
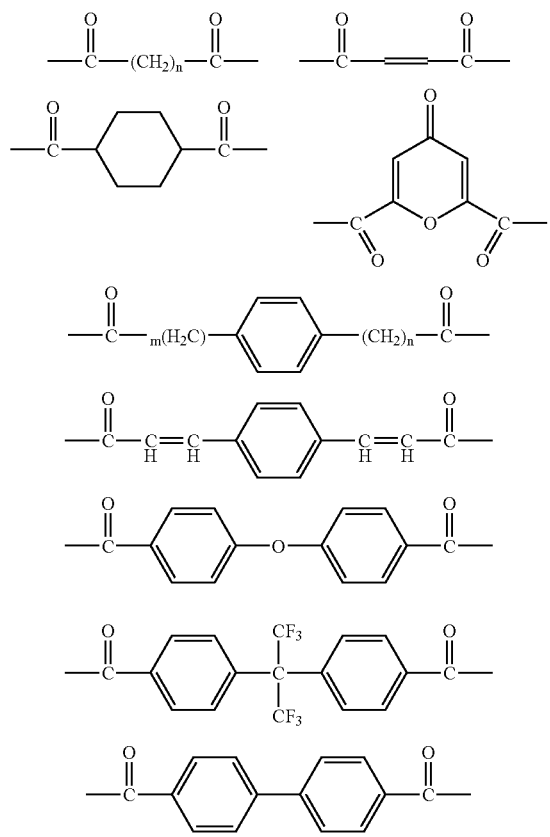
-continued
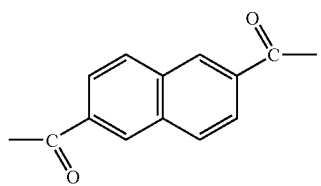
wherein $R_5$ in the Chemical Formula (I) is a carboxylic acid dianhydride moiety derived from one selected from the group consisting of the following formulas:
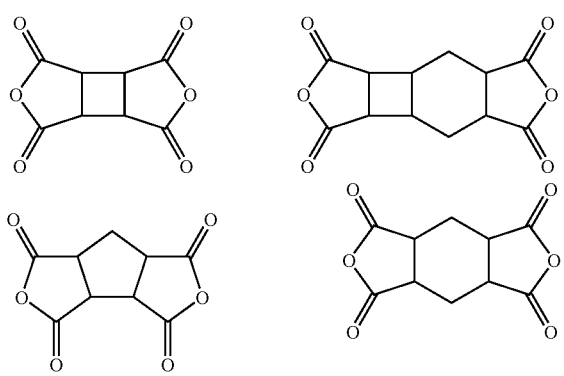
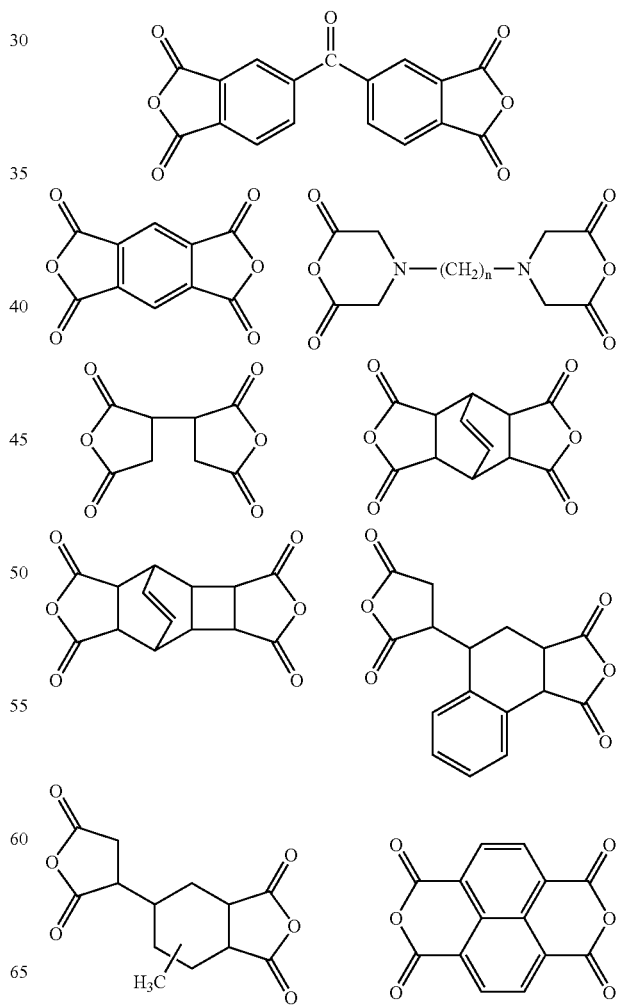

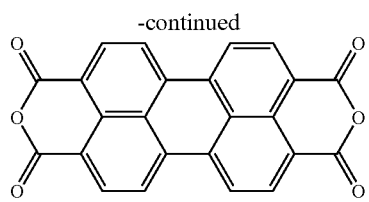

5. A liquid crystal alignment agent according to any of claims 1 to 4, wherein any benzene ring structure contained in $R_1$, $R_2$, $R_3$, $R_4$ and $R_5$ in the Chemical Formula (I) has an ortho-structure, a meta-structure or a para-structure or a mixing structure thereof.

6. A liquid crystal alignment layer containing a polymer, which is made by coating the liquid crystal alignment agent defined in any of the claims 1 to 4 on a substrate to form an alignment layer and then irradiating ultraviolet rays thereon.

7. A liquid crystal element endowed with orientation by applying a liquid crystal alignment which is made by coating the liquid crystal alignment agent defined in any of the claims 1 to 4 on a substrate to form an alignment layer and then irradiating ultraviolet rays thereon.

8. A liquid crystal element according to claim 7, wherein the liquid crystal element is used for one of liquid crystal display, compensator and optical components.

9. A liquid crystal element according to claim 8, wherein the liquid crystal display has a driving mode selected in the group consisting of STN (Super Twisted Nematic), TN (Twisted Nematic), IPS (In Plane Switching), VA (Vertical Alignment) and VATN (Vertically Aligned Tested Nematic).

10. A method for making a liquid crystal alignment layer containing polymer, comprising the steps of:

forming an alignment layer by dissolving 1~20 wt % of the liquid crystal alignment agent defined in any of the claims 1 to 4 into an organic solvent to have viscosity of 1~100 cps and then coating the agent on a substrate in a thickness of 10~500 nm; and irradiating ultraviolet rays, either polarized or unpolarized, on the surface of the alignment layer either obliquely or perpendicularly.

11. A method for making a liquid crystal alignment layer according to claim 10, wherein the organic solvent is selected from the group consisting of chlorobenzene, N-methyl-pyrrolidone (NMP), N-ethyl-pyrrolidone (NEP), N,N-dimethyl-imidazolidone (DMI), N,N-dipropyle-imidazolidone (DPI), dimethyl-formamide (DMF), dimethyl-acetamide (DMAc), dimethyl-sulfoxide (DMSO), cyclopentanon, cyclohexanon, dichloro-ethane, butyl-cellusolve, γ-butyroactone and tetra-hydrofuran, or their mixture.

12. A liquid crystal alignment agent containing triazine ring based polyimide polymer expressed by the following chemical formula (II):

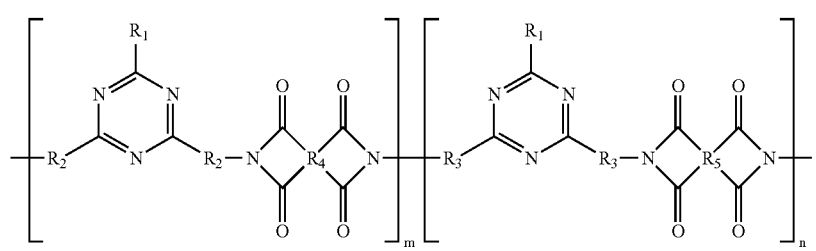

wherein $R_1$ in the Chemical Formula (II) is selected from the following formula (1a) to (4a):

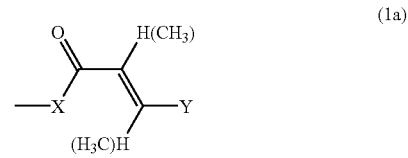

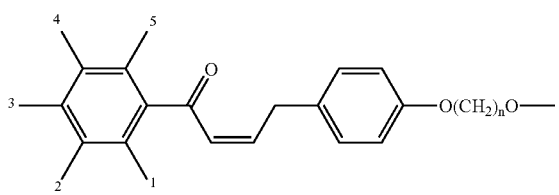

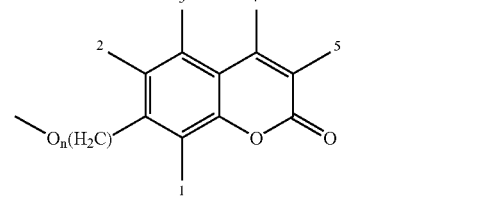

wherein X in the above formula (1a) is one selected in from the following formula:

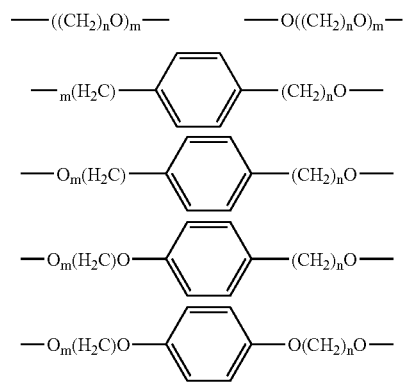

-continued

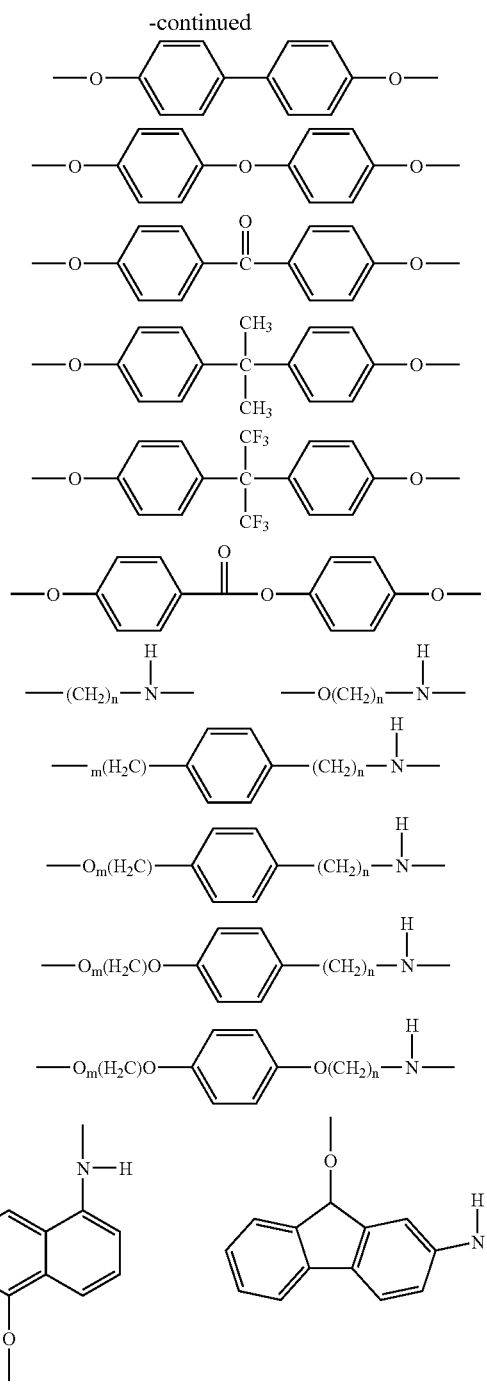

(here, m and n are 0~10, respectively)

wherein Y in the formula (1a) is one selected from the following formula:

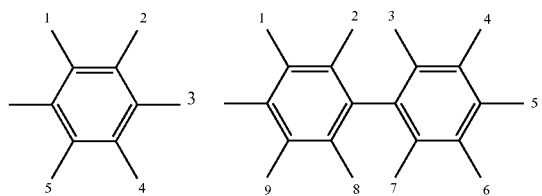

-continued

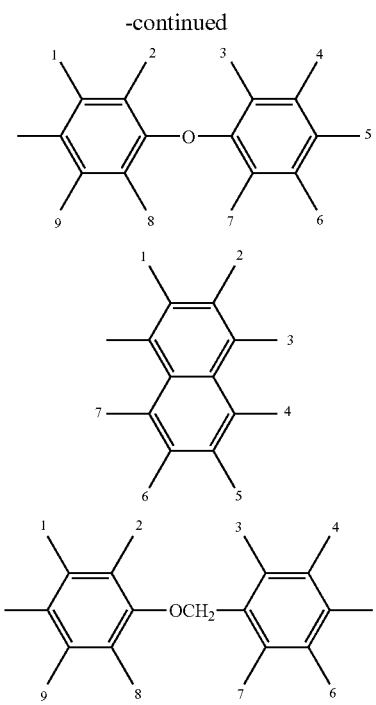

wherein the numerals 1, 2, 3, 4, 5, 6, 7, 8 or 9 in the above formula is one selected from the following formula:

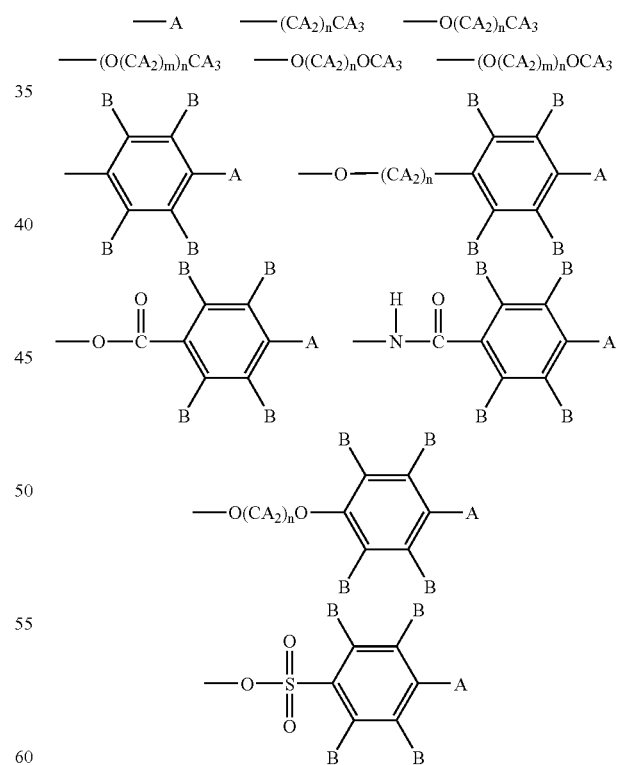

(here, m and n are respectively 0~10, and A and B are respectively H, F, Cl, CN, $CF_3$ or $CH_3$)

wherein, in the above formula (2a) and (3a), n is 0~10, and the numerals 1, 2, 3, 4 and 5 are respectively selected from the following formula:

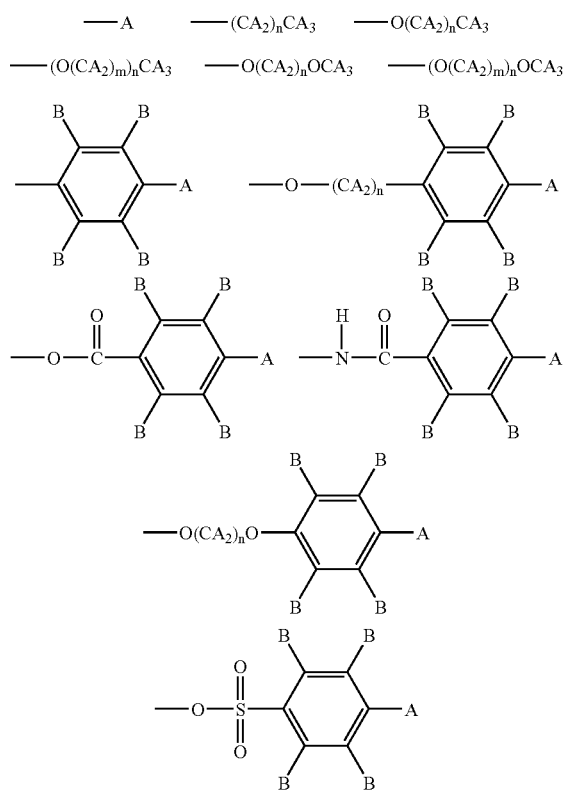

(here, m and n are respectively 0~10, and A and B are respectively H, F, Cl, CN, CF$_3$ or CH$_3$)

wherein Y in the above formula (4a) is one selected from the following formula:

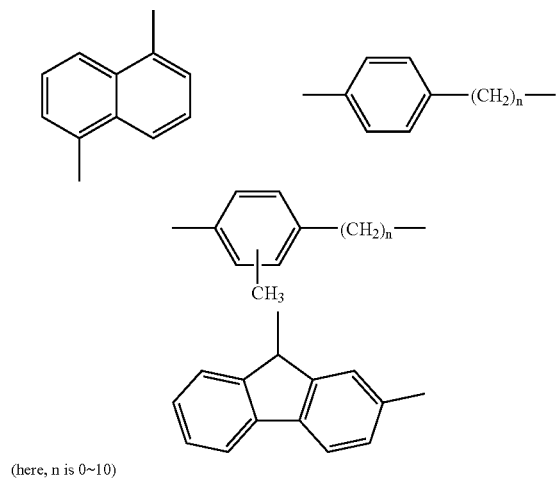

(here, n is 0~10)

wherein the numerals 1 and 2 in the above formula (4a) are respectively selected from the following formula:

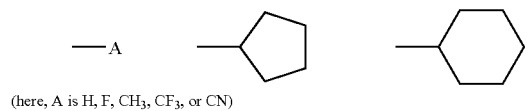

(here, A is H, F, CH$_3$, CF$_3$, or CN)

wherein R$_2$ and R$_3$ in the Chemical Formula (II) are amine moieties respectively derived from one selected from the group consisting of the following formulas:

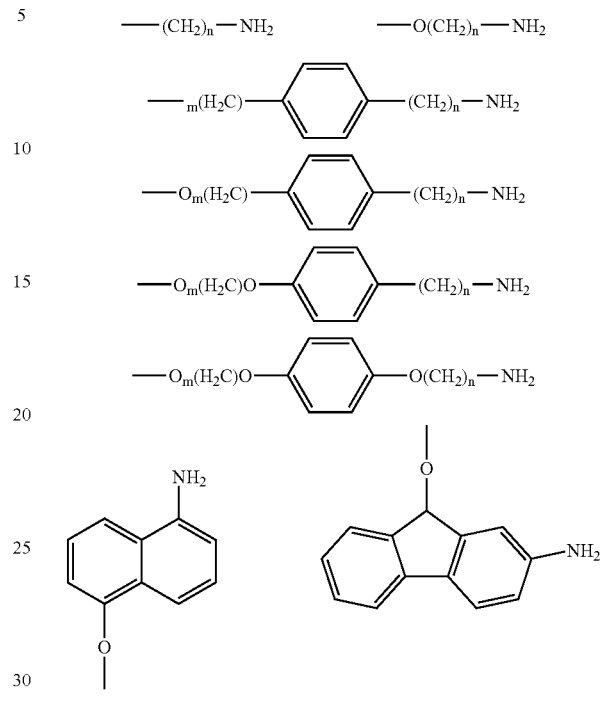

(here, m and n are 0~10, respectively)

wherein R$_4$ and R$_5$ in the Chemical Formula (II) are carboxylic acid dianhydride moieties respectively derived from one selected from the group consisting of the following formulas:

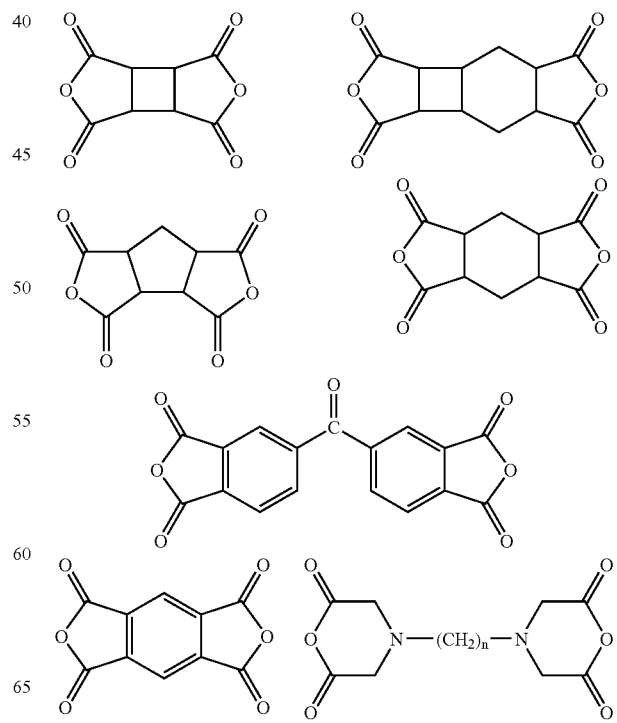

-continued
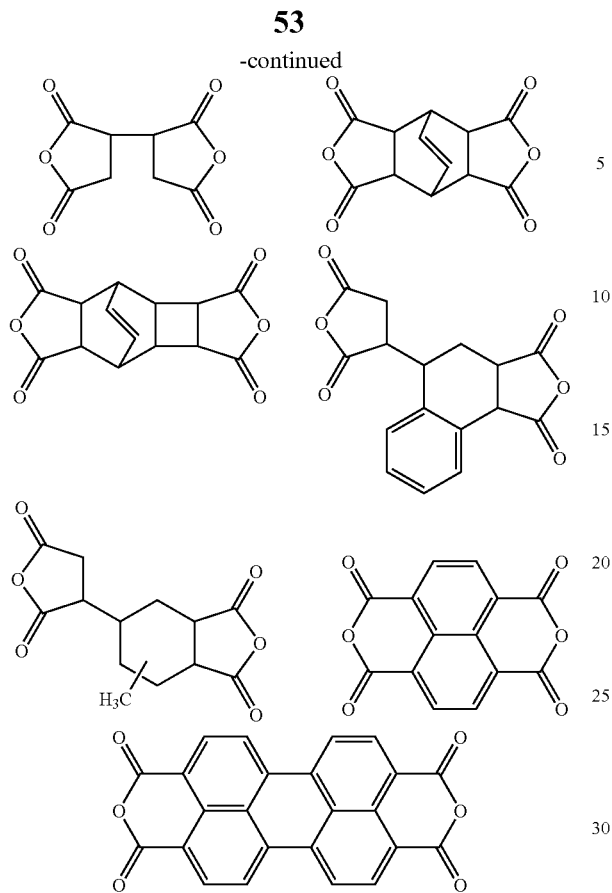
13. A liquid crystal alignment agent containing triazine ring based polymer expressed by the following chemical formula (III):
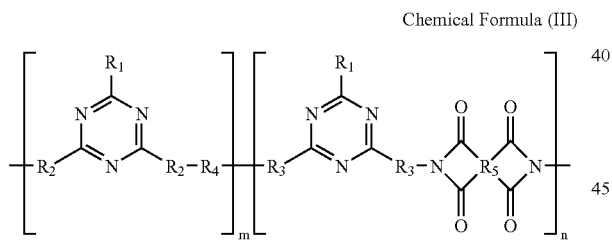
Chemical Formula (III)
wherein $R_1$ in the Chemical Formula (III) is one selected from the following formula (1a) to (4a):
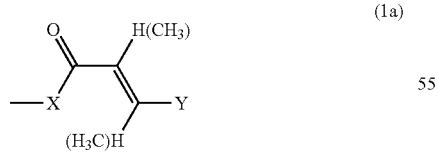
(1a)
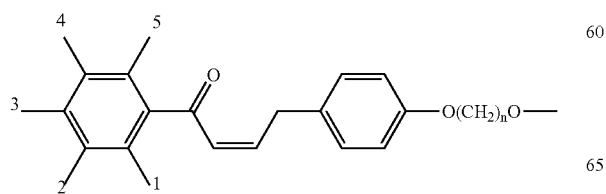
(2a)
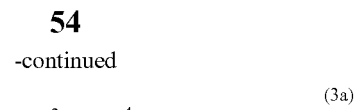
(3a)
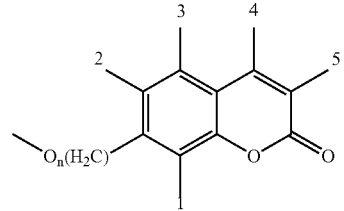
(4a)
wherein X in the above formula (1a) is one selected from the following formula:
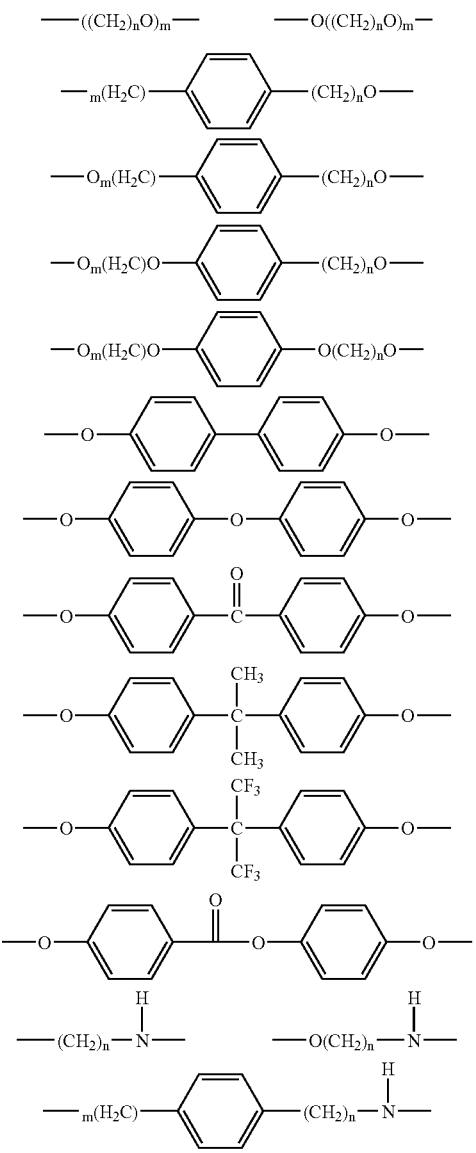

-continued

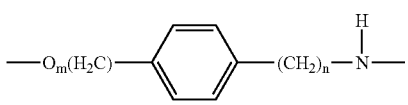
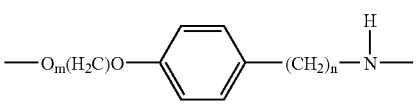
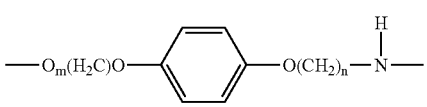
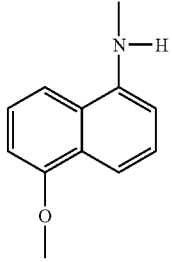
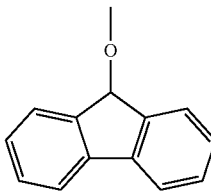

(here, m and n are 0~10, respectively)

wherein Y in the formula (1a) is one selected from the following formula:

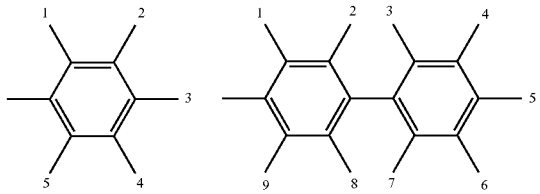
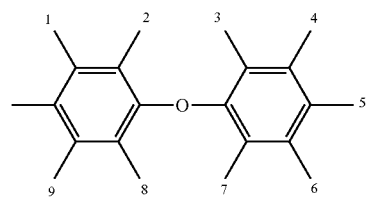
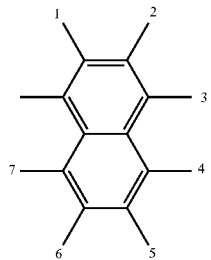
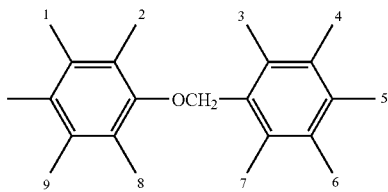

wherein the numerals 1, 2, 3, 4, 5, 6, 7, 8 or 9 in the above formula is one selected from the following formula:

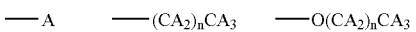
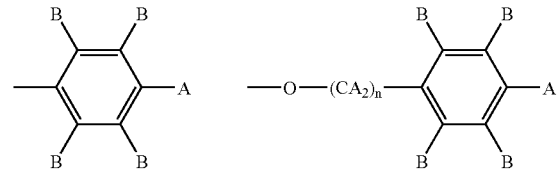
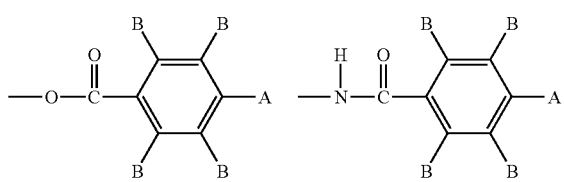
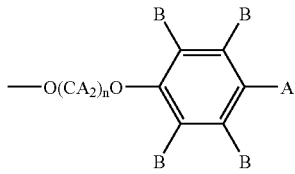
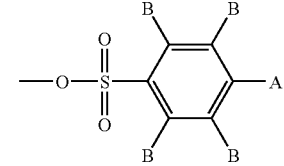

(here, m and n are 0~10 respectively, and A and B are respectively H, F, Cl, CN, $CF_3$ or $CH_3$)

wherein, in the above formula (2a) and (3a), n is 0~10, and the numerals 1, 2, 3, 4 and 5 are respectively selected from the following formula:

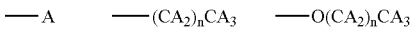
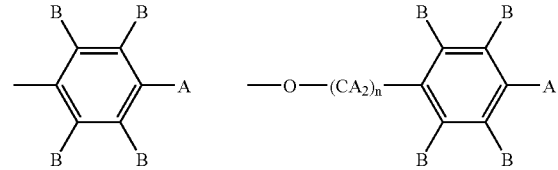
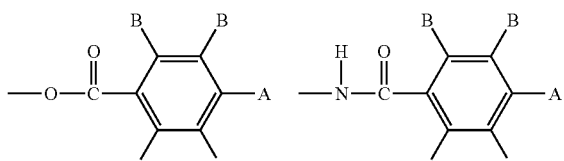
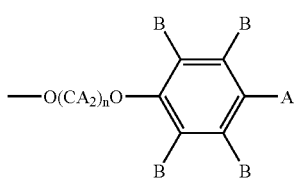

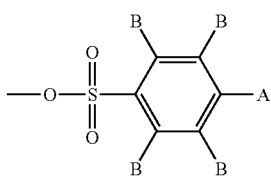

(here, m and n are respectively 0~10, and A and B are respectively H, F, Cl, CN, CF$_3$ or CH$_3$)

wherein Y in the above formula (4a) is one selected from the following formula:

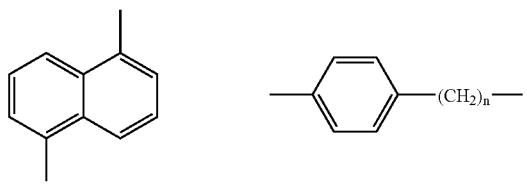
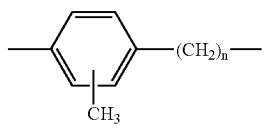
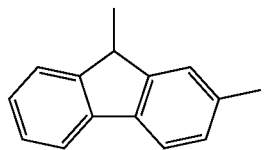

(here, n is 0~10)

wherein the numerals 1 and 2 in the above formula (4a) are respectively selected from the following formula:

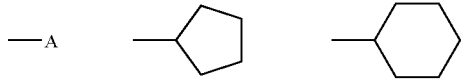

(here, A is H, F, CH$_3$, CF$_3$, or CN)

wherein R$_2$ and R$_3$ in the Chemical Formula (III) are amine moieties respectively derived from one selected from the group consisting of the following formulas:

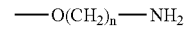
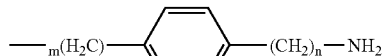
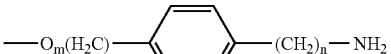
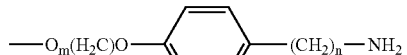

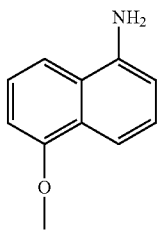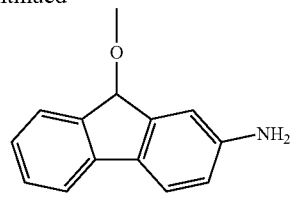

(here, m and n are 0~10, respectively)

wherein R$_4$ in the Chemical Formula (III) is a carboxylic acid moiety selected from the group consisting of the following formulas:

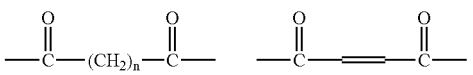
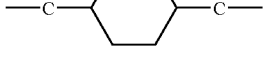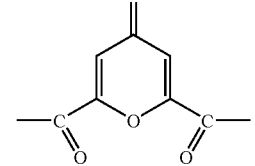
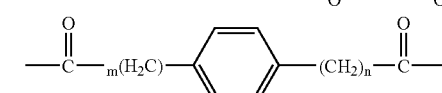
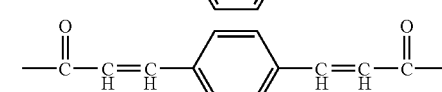
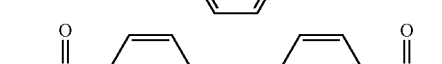
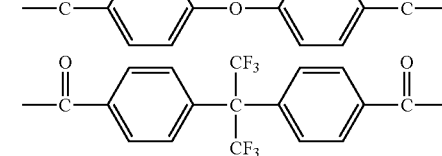
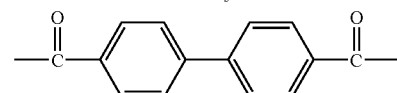
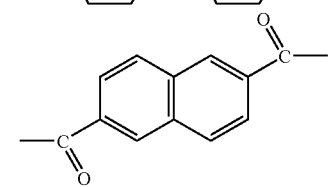

wherein R$_5$ in the Chemical Formula (III) is a carboxylic acid dianhydride moiety derived from one selected from the group consisting of the following formulas:

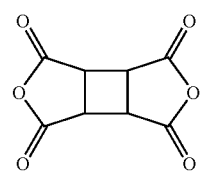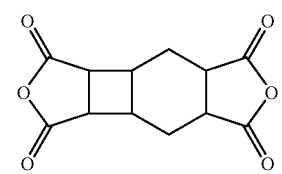

-continued
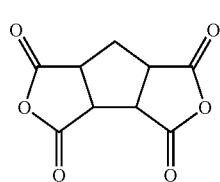 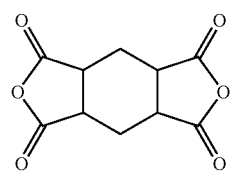 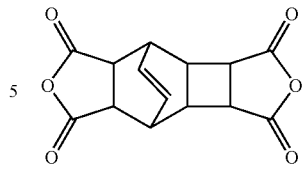 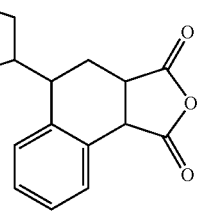
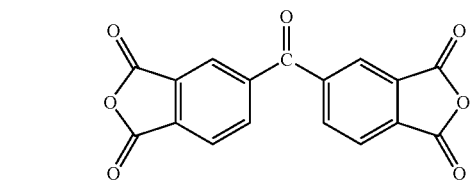 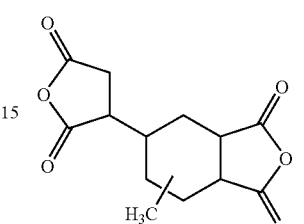
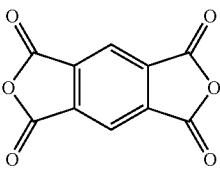 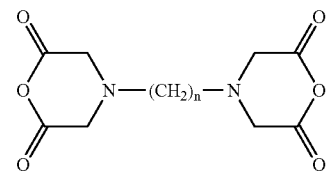 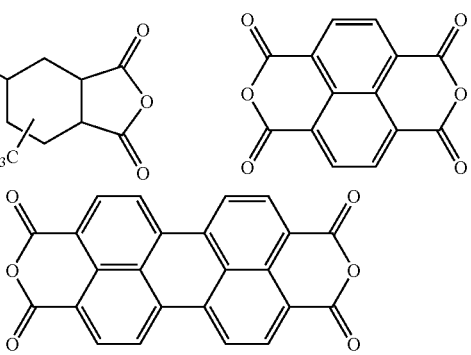
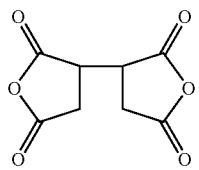 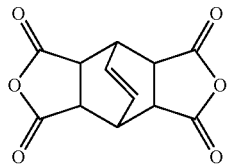
14. A liquid crystal alignment agent according to claim 13,
   wherein the polymer having the structure of the chemical formula (III) is used as a compatibilizer for suppressing phase separation of polyamide and polyimide.
* * * * *